US010477041B2

(12) United States Patent
Asai

(10) Patent No.: US 10,477,041 B2
(45) Date of Patent: Nov. 12, 2019

(54) NON-TRANSITORY RECORDING MEDIUM STORING INSTRUCTIONS FOR MOBILE TERMINAL USING NFC AND MOBILE TERMINAL USING NFC

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/409,133

(22) Filed: Jan. 18, 2017

(65) Prior Publication Data

US 2017/0208429 A1 Jul. 20, 2017

(30) Foreign Application Priority Data

Jan. 19, 2016 (JP) ................................ 2016-008335

(51) Int. Cl.

| | |
|---|---|
| ***H04N 1/00*** | (2006.01) |
| ***H04N 1/32*** | (2006.01) |
| ***H04W 4/80*** | (2018.01) |
| ***H04W 8/24*** | (2009.01) |
| *H04M 1/725* | (2006.01) |

(52) U.S. Cl.

CPC ..... *H04N 1/00307* (2013.01); *H04N 1/00973* (2013.01); *H04N 1/32117* (2013.01); *H04W 4/80* (2018.02); *H04W 8/24* (2013.01); *H04M 1/72533* (2013.01); *H04N 2201/006* (2013.01);

(Continued)

(58) Field of Classification Search

CPC .... H04W 4/008; H04W 8/24; H04N 1/00307; H04N 1/00973; H04N 1/32117; H04N 2201/3222; G06F 3/1205; G06F 3/1232; G06F 3/1292; G06F 3/1255

See application file for complete search history.

(56) References Cited

U.S. PATENT DOCUMENTS

| | | | | |
|---|---|---|---|---|
| 9,423,986 B2 | 8/2016 | Asai | | |
| 2014/0253965 A1* | 9/2014 | Asai | ...................... G06F 3/1205 358/1.15 | |
| 2016/0335033 A1 | 11/2016 | Asai | | |

FOREIGN PATENT DOCUMENTS

| | | |
|---|---|---|
| JP | 2007-166538 A | 6/2007 |
| JP | 2014-174664 A | 9/2014 |

* cited by examiner

*Primary Examiner* — Jianxun Yang

(74) *Attorney, Agent, or Firm* — Banner & Witcoff, Ltd.

(57) ABSTRACT

A non-transitory recording medium of a mobile terminal having contains instructions which, when executed by the controller, cause the mobile terminal to receive a user condition, identify a designated device, receive ability information from the designated device, receive availability information, transmit first execution instruction information to the designated device in response to determination that the user condition falls within the rage of the ability information, the first execution instruction information instruction execution of the operation according to the user condition, determine whether the availability information is the first value or the second value in response to determination that the user condition is out of the range of the ability information, and transmit second execution instruction information to the designated device in response to determination that the availability information is the first value, the second execution instruction information instructing execution of the operation according to the device condition.

14 Claims, 12 Drawing Sheets

(52) U.S. Cl.
CPC ................ *H04N 2201/0055* (2013.01); *H04N 2201/0094* (2013.01); *H04N 2201/3205* (2013.01)

| DEVICE ID | MFP-A | | |
|---|---|---|---|
| | FEED TRAY INFORMATION | DISCHARGE TRAY INFORMATION | COLOR INFORMATION |
| ABILITY INFORMATION | TRAY 1 | TRAYs 1&2 | MONOCHROME |
| AUTO CONDITION INFORMATION | TRAY 2 | TRAY1 > TRAY2 | — |
| AVAILABILITY INFORMATION | ON | ON | OFF |

FIG. 3A

| DEVICE ID | MFP-B | | |
|---|---|---|---|
| | FEED TRAY INFORMATION | DISCHARGE TRAY INFORMATION | COLOR INFORMATION |
| ABILITY INFORMATION | TRAYs 1&2 | TRAY 1 | MONOCHROME, COLOR |
| AUTO CONDITION INFORMATION | TRAY2 > TRAY1 | TRAY 1 | — |
| AVAILABILITY INFORMATION | ON | ON | OFF |

FIG. 3B

| DEVICE ID | MFP-A | | |
|---|---|---|---|
| | FEED TRAY INFORMATION | DISCHARGE TRAY INFORMATION | COLOR INFORMATION |
| ABILIY INFORMATION | TRAY 1 | TRAYs 1&2 | MONOCHROME |
| AUTO CONDITION INFORMATION | TRAY 1 | TRAY1 > TRAY2 | — |
| AVAILABILITY INFORMATION | ON | ON | OFF |

FIG. 4A

| DEVICE ID | USER CONDITION INFORMATION | | | AUTO CONDITION INFORMATION | | | HISTORY CONDITION INFORMATION | | |
|---|---|---|---|---|---|---|---|---|---|
| | FEED | DISCHARGE | COLOR | FEED | DISCHARGE | COLOR | FEED | DISCHARGE | COLOR |
| MFP-A | 1 | 1 | COLOR | 1 | 1 > 2 | — | 1 | 1 | MONOCHROME |
| MFP-B | 2 | 2 | COLOR | 2 > 1 | 1 | — | 2 | 1 | COLOR |
| ⋮ | ⋮ | ⋮ | ⋮ | ⋮ | ⋮ | ⋮ | ⋮ | ⋮ | ⋮ |

FIG. 4B

NON-TRANSITORY RECORDING MEDIUM STORING INSTRUCTIONS FOR MOBILE TERMINAL USING NFC AND MOBILE TERMINAL USING NFC

CROSS-REFERENCE TO RELATED APPLICATIONS

This application claims priority under 35 U.S.C. § 119 from Japanese Patent Application No. 2016-008335 filed on Jan. 19, 2016. The entire subject matter of the application is incorporated herein by reference.

BACKGROUND

Technical Field

The present disclosures relate to a non-transitory recording medium storing instructions for a mobile terminal using an NFC (near field communication) to operate an image processing apparatus, and the mobile terminal.

Related Art

Recently, techniques have been developed to control an image processing apparatus from a mobile terminal with use of wireless communication methods such as Bluetooth®, Wi-Fi® and the NFC. For example, there is known a technique in which the mobile terminal receives information indicating a communication method of a printer through the NFC, and the mobile terminal transmits print data to the printer according to the communication method indicated by the received information.

SUMMARY

In the above-mentioned configuration, when a user of a mobile terminal attempts to cause a printer to execute a printing operation in accordance with a desired execution condition, there may be a case where the printer cannot execute the printing operation appropriately since the printer does not correspond to the user-desired execution condition. For example, when the execution condition of the user instructs the printer to feed a sheet from a second sheet tray but the printer only has a single sheet tray, the printer cannot feed the sheet from the instructed sheet tray (i.e., the second sheet tray).

In consideration of the above, according to aspects of the disclosures, there is provided a mobile terminal which is capable of causing a designated device, which is recognized with use of the NFC, to execute data processing of image data in accordance with an appropriate execution condition.

According to aspects of the disclosures, there is provided a non-transitory recording medium of a mobile terminal having a controller, a first communication interface, a second communication interface and an input interface, the non-transitory recording medium storing computer-readable instructions, the first communication interface being configured to execute a near field communication, the second communication interface being configured to executed a wireless communication of which communicatable range being wider than that of the first communication interface. The instructions, when executed by the controller, cause the mobile terminal to execute a condition reception process to receive a user condition through the input interface, the user condition being an execution condition of an operation with respect to image data executed by an image processing apparatus, to execute an identifying process to identify the image processing apparatus communicatable through the first communication interface as a designated device, to execute a first receiving process to receive ability information of the designated device from the designated device through one of the first communication interface and the second communication interface, to execute a second receiving process to receive availability information indicating whether the designated device is configured to execute the operation according to the device condition from the designated device through one of the first communication interface and the second communication interface, the availability information having one of a first value and a second value, the first value indicating that the designated device is configured to execute operation according to the device condition, the second value indicating that the designated device is not configured to execute the operation according to the device condition, the device condition being the execution condition determined by the designated device, to determine, in a first determination process, whether the user condition falls within a range of the ability information, to execute a first execution instruction process to transmit first execution instruction information to the designated device through the second communication interface in response to determination that the user condition falls within the rage of the ability information, the first execution instruction information being information to instruct execution of the operation according to the user condition, to determine, in a second determination process, whether the availability information is the first value or the second value in response to determination that the user condition is out of the range of the ability information, and to execute a second execution instruction process to transmit second execution instruction information to the designated device through the second communication interface in response to determination that the availability information is the first value, the second execution instruction information being information instructing execution of the operation according to the device condition.

According to aspects of the disclosures, there is also provided a mobile terminal, which is provided with a first communication interface configured to execute a near field communication, a second communication interface configured to executed a wireless communication of which communicatable range being wider than that of the first communication interface, an input interface, and a controller. The controller is configured to cause the mobile terminal to execute a condition reception process to receive a user condition through the input interface, the user condition being an execution condition of an operation with respect to image data executed by an image processing apparatus, to execute an identifying process to identify the image processing apparatus communicatable through the first communication interface as a designated device, to execute a first receiving process to receive ability information of the designated device from the designated device through one of the first communication interface and the second communication interface, to execute a second receiving process to receive availability information indicating whether the designated device is configured to execute the operation according to the device condition from the designated device through one of the first communication interface and the second communication interface, the availability information having one of a first value and a second value, the first value indicating that the designated device is configured to execute operation according to the device condition, the second value indicating that the designated device is not configured to execute the operation according to the device condition, the device condition being the execution condition determined by the designated device, to determine, in a first determination process, whether the user condition falls within a range of the ability information, to execute a first execution instruction process to transmit first execution instruction information to the designated device through the second communication interface in response to determination that the user condition falls within the rage of the ability information, the first execution instruction information being information to instruct execution of the operation according to the user condition, to determine, in a second determination process, whether the availability information is the first value or the second value in response to determination that the user condition is out of the range of the ability information, and to execute a second execution instruction process to transmit second execution instruction information to the designated device through the second communication interface in response to determination that the availability information is the first value, the second execution instruction information being information instructing execution of the operation according to the device condition.

According to aspects of the disclosures, there is also provided a method of controlling a mobile terminal having a communication interface configured to execute a wireless communication, and an input interface. The method includes receiving the user condition through the input device, identifying a designated device which is communicatable through the communication interface, receiving ability information from the designated device through the communication interface, receiving availability information through the communication interface, determining whether the user condition falls within the rage of the ability information, transmitting first execution instruction information to the designated device when the user condition falls within the rage of the ability information, the first execution instruction information instructing execution of the operation according to the user condition, determining whether the availability information is the first value or the second value when the user condition is out of the range of the ability information, and transmitting second execution instruction information to the designated device when the availability information is the first value, the second execution instruction information instructing execution of the operation according to the device condition.

BRIEF DESCRIPTION OF THE ACCOMPANYING DRAWINGS

FIG. 1 schematically shows a configuration of a system according to an illustrative embodiment of the disclosures.

FIG. 3A shows an example of apparatus information of an MFP stored in a data storage area thereof according to the illustrative embodiment of the disclosures.

FIG. 3B shows an example of apparatus information of another MFP stored in the data storage area thereof according to the illustrative embodiment of the disclosures.

FIG. 4A shows an example of designated apparatus information stored in a data storage area of a mobile terminal according to the illustrative embodiment of the disclosures.

FIG. 4B shows an example of a history list stored in the data storage of the mobile terminal according to the illustrative embodiment of the disclosures.

DETAILED DESCRIPTION OF THE EMBODIMENT

Hereinafter, referring to the accompanying drawings, an illustrative embodiment according to the disclosures will be described. It should be noted that the illustrative embodiment described hereinafter is only an example of a described configuration and can be modified in various ways without departing from aspects of the disclosures. For example, an order of execution of processes described later could be changed without changing the aspects of the disclosures.

Figure 1:
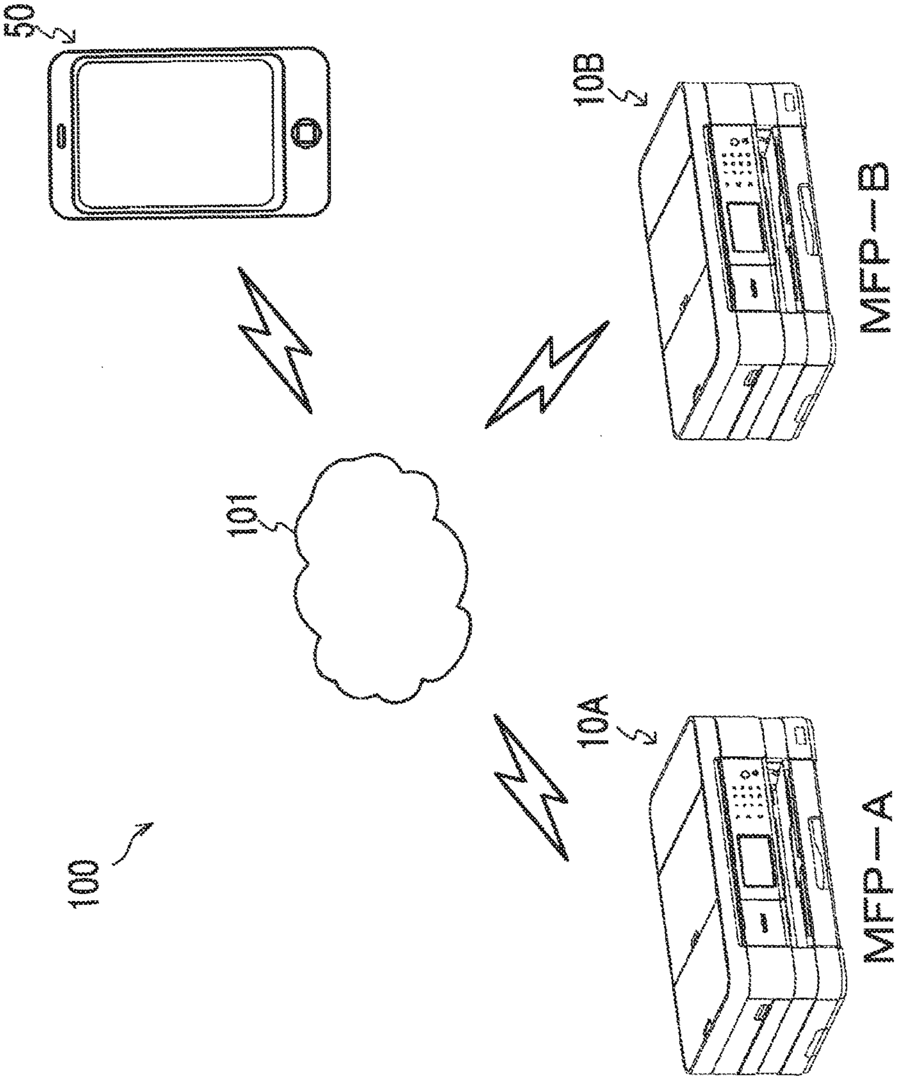

FIG. 1 shows a system 100 according to an illustrative embodiment of the disclosures. The system 100 shown in FIG. 1 includes an MFP (multi-function peripheral) 10A, an MFP 10B (hereinafter, multiple MFP's will also be collectively referred to as MFP's 10), and a mobile terminal 50.

The MFP's 10 and the mobile terminal 50 are configured to communicate with each other through a communication network 101. The communication network 101 may be a wired LAN (local area network), a wireless LAN, or combination of the wired LAN and wireless LAN.

It is noted that the number of the MFP's 10 need not be limited to two as shown in FIG. 1. In the following description, however, only two MFP's 10 are referred to in order to simplify the description.

Figure 2A:
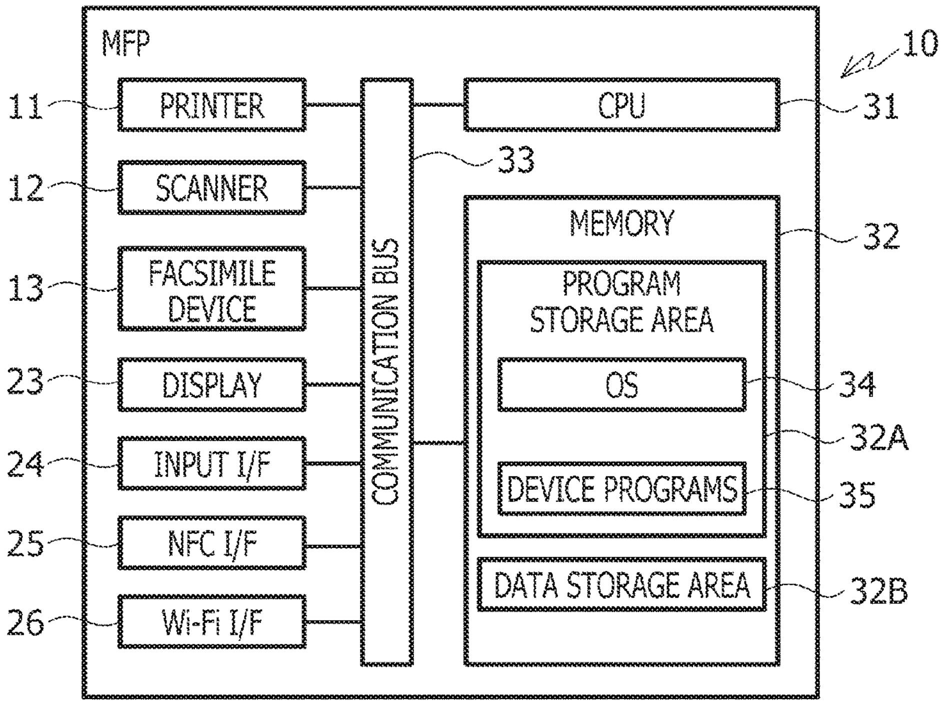
FIG. 2A is a block diagram of an MFP (multi-function peripheral) of the system shown in FIG. 1 according to the illustrative embodiment of the disclosures.
Figure 2B:
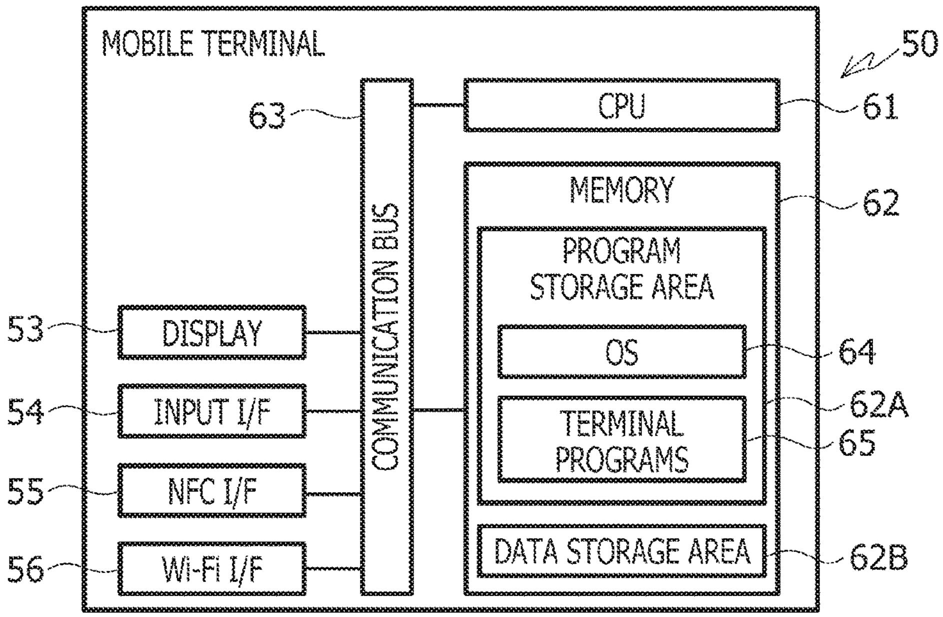
FIG. 2B is a block diagram of a mobile terminal of the system shown in FIG. 1 according to the illustrative embodiment of the disclosures.

The MFP 10 mainly includes, as shown in FIG. 2A, a printer 11, a scanner 12, a facsimile device 13, a display 23, an input I/F (interface) 24, an NFC communication I/F 25, a Wi-Fi® communication I/F 26, a CPU (central processing unit) 31, a memory 32, and a communication bus 33. Components constituting the MFP 10 are interconnected through the communication bus 33. It is noted that the MFP 10 is an example of an image processing apparatus.

The printer 11 is configured to execute a printing operation to record (print) an image represented by image data on a sheet. It is noted that, as a recording method of the printer 11, a well-known inkjet printing method or a well-known electrophotographic imaging method may be employed. The scanner 12 is configured to execute a scanning operation to read an image formed on an original and generate image data representing the read image. The facsimile device 13 is configured to execute a facsimile operation to transmit/receive image data in accordance with a facsimile protocol. The MFP 10 may be configured to execute a composite operation in which multiple operations are combined. An example of the composite operation includes a copying operation in which the image data is generated by executing the scanning operation, and then the printing operation is executed to record the image represented by the image data on the sheet.

It is noted that the executable operations of the MFP's 10A and 10B need not identical. According to the illustrative embodiment, the MFP 10A is configured to execute the printing operation and the facsimile operation, while the MFP 10B is configured to execute the printing operation, the scanning operation and the copying operation. Further, the image processing apparatus need not be limited to one configured to execute multiple operations, but could be an apparatus configured to execute a single operation.

The display 23 has a display screen which is configured to display various pieces of information. As the display 23, an LCD (liquid crystal display), an organic EL (electro-luminescence) display and the like can be employed. It is noted that, when an input I/F 24 (described later) is a touch sensor, the display 23 serves as a so-called touch panel display.

The input I/F 24 is a user interface configured to receive user operations to designate objects displayed on the display screen of the display 23. For example, the input I/F 24 may have buttons, and may transmit operation signals respectively corresponding to the buttons to the CPU 31 when the buttons are depressed. For another example, the input I/F 24 may be a film-like touch sensor overlaid on the display screen of the display 23. In this case, the input I/F 24 (i.e., the touch sensor) may transmits operation signals corresponding to touching operations on the objects displayed on the display 23 to the CPU 31.

It should be noted that an "object" above means an image which the user can designate by operating the input I/F 24. For example, the object may include a character string, an icon, a button, a link displayed on the display 23. The object may be designated when the user depresses a direction key or a determination button of the input I/F 24. When the input I/F 24 is a touch sensor, the object displayed on the display 23 may be designated as the user touches the touch sensor at a position where the object is displayed on the display 23.

When the input I/F 24 is a touch sensor, the input I/F 24 transmits position information, which indicates a position on the display screen where the user has touched, to the CPU 31 as the operation signal. It is noted that the term "touch" in throughout the specification includes an entire operation to bring an inputting medium to contact with the touch sensor. Thus, the operation of "touch" includes a tapping operation to make the input medium, which has touched the touch sensor, out of contact from the touch sensor within a particular period of time, a long touching operation, a sliding operation which is an operation of sliding the input medium on the touch sensor with maintaining a contacting state, a flicking operation, a pinching-out operation and the like.

Additionally, the concept of the term "touch" may include a situation where the input medium is very close to the surface of the touch sensor but does not contact the same. Further, the input medium may be a finger of the user and/or a touch pen and the like. In the following description, tapping operation at the position of an icon displayed on the display 53 will be referred to as an example of the user operation to designate the icon.

The NFC communication I/F 25 is an example of a first communication interface which is capable of transmitting/receiving a wireless signal to/from an external apparatus. That is, the MFP 10 is configured to transmit various pieces of information to the mobile terminal 50 through the NFC communication I/F 25, and receives various pieces of information from the mobile terminal 50 through the NFC communication I/F 25. It is noted that a communication range of the wireless communication using the NFC communication I/F 25 (hereinafter, referred to as an NFC communication) is generally narrower than a communication range of the wireless communication using the Wi-Fi communication I/F 26 (hereinafter, referred to as a Wii-Fi communication). Further, a communication speed of the NFC communication is slower than that of the Wi-Fi communication speed.

The NFC communication I/F 25 is an interface for executing the wireless communication in accordance with a near field wireless communication based on the NFC standard. The NFC communication is an example of the near field communication. The NFC communication I/F 25 has an IC chip having a memory which is used to store information to be exchanged with the external apparatus. The NFC standard is an example the near field communication protocol. Another example of the near field communication protocol includes TransferJet®.

The Wi-Fi communication I/F 26 is an example of a second communication interface which is communicatable with the external apparatus. The MFP 10 transmits/receives various pieces of information to/from the mobile terminal 50 through the Wi-Fi communication I/F 26. It is noted that the communicatable range of the Wi-Fi communication is wider than that of the NFC communication. Further, the communication speed of the Wi-Fi communication is faster than that of the NFC communication.

The Wi-Fi communication I/F 26 is capable of executing an indirect wireless communication, which is a wireless communication with the external apparatus through the communication network 101. That is, the Wi-Fi communication I/F 26 is capable of executing the wireless communication with the external apparatus via a relaying device such as an access point. Optionally, the Wi-Fi communication I/F 26 may be configured to execute a direct wireless communication, which is a wireless communication directly with the external apparatus without using the relaying device. In the following description, one of the Wi-Fi communications, which does not used the relaying device will be referred to as a "Wi-Fi direct communication". It is noted that an actual communication procedure of the Wi-Fi communication I/F 26 need not be limited to a particular one. An example of such a communication procedure may employ the Wi-Fi communication for the indirect wireless communication, and the Wi-Fi direct communication for the direct wireless communication.

The CPU 31 is configured to control an entire operation of the MFP 10. The CPU 31 retrieves programs from the memory 32 and executes the same based on the information output by the input I/F 24, information obtained from the external apparatus through the NFC communication I/F 25 and/or the Wi-Fi communication I/F 26, and the like. It is noted that the CPU 31 and the memory 32 constitute an example of a controller.

The memory 32 includes a program storage area 32A and the data storage area 32B. In the program storage area 32A, an OS (operating system) 23 and a device program 35 are stored. The device program 35 may be a single program or a group of multiple programs. The data storage area 32B stores data/information necessary to execute the device program 35.

It should be noted that the "data" and the "information" used in the specification are common in regard to a point that both are bit(s) or a bit string which can be handled by a computer. In the specification, the computer is capable of handling the "data" regardless of the meaning of the bit or bit string. In contrast, the computer handles the "information" such that operations of the computer vary depending on the meaning of respective bit or bit string. Further, an "instruction" represents a control signal causing a destination device, to which the instruction is transmitted, to execute a succeeding operation. The "instruction" may include the "information" or the "instruction" itself may have a property as the information.

It should also be noted that multiple pieces of data or information respectively used in different computers are regarded as the same data or information as far as only difference among the multiple pieces of data/information is a type (e.g., whether the data/information is of a text type, a binary type, a flag type or the like) but the meanings represented by the multiple pieces of data/information are the same. For example information representing there are "two" items may be stored as text type information, "0x32" (ASCII code) on one computer, and in another computer, the same information may be stored as binary format information, "10" (binary notation).

It should further be noted that, although it is described that the "data" and "information" should be distinguished from each other, a distinction therebetween is not always strict, but "data" and/or "information" may be treated as "information" and/or "data." That is, in a particular occasion, "data" may be treated as "information" temporarily, or "information" may be treated as "data" temporarily. Alternatively, what is treated as "data" in a certain apparatus may be treated as "information" in another apparatus. Further, "information" may be extracted from "data," and/or vice versa.

The memory 32 may include a RAM (random access memory), a ROM (read only memory), an EEPROM (electrically erasable programmable read only memory), an HDD (hard disk drive), a portable storage device attachable to and detachable from the MFP 10 (e.g., USB memory), a buffer provided to the CPU 31 and the like, and/or a combination of some of or all of such storages.

It is noted that the memory 32 may be a non-transitory computer-readable storage medium. The non-transitory computer-readable storage medium includes, in addition to ones listed above as storages that may be included in the memory 32, recording mediums such as a CD-ROM, and DVD-ROM. It is noted that the non-transitory medium is also a tangible medium. In contrast, an electrical signal, which carries programs downloaded, for example, from a server on the Internet, is a computer-readable signal medium, which is one type of the computer-readable medium, but not categorized as the non-transitory computer-readable storage medium.

The programs stored in the program storage area 32A are executed by the CPU 31. In the following description, however, execution of the programs may be explained by omitting description of the CPU 31 for brevity. That is, in the following description, a recitation such as "the CPU 31 executes process A defined by program A" will occasionally be recited such that "program A executes process A." Regarding the information processing terminal 50, description will be made in a similar manner.

The OS 34 is a basic program which provides an API to control hardware constituting the MFP 10 (e.g., the printer 11, the scanner 12, the display 23, the input I/F 24, the NFC communication I/F 25, the Wi-Fi communication I/F 26 and the like). The aforementioned programs control respective components of the hardware by calling the API provide by the OS 34. In the following description, however, a recitation of the OS 34 may be omitted to describe the operations of respective programs. That is, in the following description, a situation that "program B controls hardware C through the API provided by the OS 34" may occasionally be recited such that "program B controls hardware C" for brevity. The similar recitation is made for describing the information processing terminal 50.

The device program 35 is configured to retrieve, edit or delete the data stored in the data storage area 32B by executing the access API provided by the OS 34. In the API, data ID to identify the data to be accessed is designated as an argument. The data ID is information of which format meets one used to designate the data in the access API. The data ID is, for example, a file path or a URI. It is noted that a part of, or all of the data stored in the data storage area 32B may be stored in an external server (not shown) such as a cloud server. Thus, the device program 35 may be configured to transmit/receive various pieces of data to/from the external server through the communication device 25. In such a case, the data ID may have, for example, a form of the URL which is used to download the data from the external server. A terminal program 65 is configured similarly so as to retrieve, edit of delete data stored in the data storage area 62B by executing the access API provided by the OS 64.

The data storage area 32B is configured such that the device ID's, ability information, the auto condition information and availability information (hereinafter, these pieces of information will be collectively referred to as "device information") in association with each other. The device information may be stored in the data storage area 32B, for example, as MIB (management information base). The device information is set, for example, by a manufacturer when the MFP 10 is shipped. The auto condition information may be modified by the user through the input I/F 25. According to the illustrative embodiment, FIG. 3A shows the device information of the MFP 10A, and FIG. 3B shows the device information of the MFP 10B.

The device ID is an example of device identification information for identifying the MFP 10. According to the illustrative embodiment, the MFP 10A is identified by the device ID "MFP-A" and the MFP 10B is identified by the device ID "MFP-B". The ability information, the auto condition information and the availability information are stored in association with operations, respectively, which the MFP 10 can execute. It is noted that, in FIGS. 3A and 3B, only the ability information, the auto information and the availability information associated with the printing operation are shown.

The ability information, the auto condition information and the availability information associated with the printing operation include, for example, feed tray information, discharge tray information and color information as shown in FIGS. 3A and 3B. The feed tray information is information for identifying a tray which is a feeding source of the sheets on which images are to be formed in the printing operation. The discharge tray information is information for identifying a tray which is a discharging destination of the sheets on which the images have been formed in the printing operation. The color information is information for identifying color (e.g., "monochrome" or "color") used in the printing operation.

The feed tray information, the discharge tray information and the color information are examples of items included in the execution condition. It is noted that concrete items included in the execution condition need not be limited to such information. Further, the execution condition corresponding to the scanning operation may include resolution information indicating a reading resolution, color information indicating a reading color, and format information indicating a format of generated image data (e.g., "JPEG", "TIFF" and the like). The execution condition corresponding to the FAX transmission operation may include source information indicating a source of image data to be transmitted by facsimile (e.g., "scanner", "storage" and the like), destination information for identifying a destination device of the facsimile transmission.

The ability information indicates the ability of the MFP 10. Specifically, the ability information includes a list of execution conditions which can be selected to execute the printing operations. The auto condition information indicates an execution condition (hereinafter, referred to as an "auto condition") to be used when print instruction information in which the execution condition is not instructed is received from the mobile terminal 50. The auto condition is an example of a device condition determined by the MFP 10. In other words, the MFP 10 according to the illustrative embodiment is configured such that, in response to receipt of the print instruction information in which the execution condition is not defined, the MFP 10 determines the execution condition based on a particular rule and executes the printing operation in accordance with the determined execution condition.

The ability information shown in FIG. 3A indicates that, as the execution condition of the printing operation by the MFP 10A, only "TRAY 1" can be designated as the feeding source of the sheets, ether "TRAY 1" or "TRAY 2" can be designated as the discharging destination of the sheets, and only "MONOCHROME" can be designated as the color used in the printing operation. That is, the printer 11 of the MFP 10A is a monochromatic printer having one feed tray and two discharge trays. Further, the auto condition information shown in FIG. 3A indicates, as the execution condition of the printing operation according to the print instruction in which the execution condition is not defined, "TRAY 1" is designated as the feeding source of the sheets, and "TRAY 1>TRAY 2" is designated as the discharging destination of the sheets.

It is noted that the indication "TRAY 1>TRAY 2" of the discharge tray information means that "TRAY 1" is given higher priority than "TRAY 2". That is, the MFP 10A executes the printing operation in accordance with the auto condition including the discharge tray information of "TRAY 1" in response to the number of sheets having been discharged on the tray 1 being less than a threshold value. Further, the MFP 10A executes the printing operation in accordance with the auto condition including the discharge tray information of "TRAY 2" in response to the number of sheets having been discharged on the tray 1 being equal to or greater than a threshold value.

The ability information shown in FIG. 3B indicates that, as the execution condition of the printing operation by the MFP 10B, either "TRAY 1" or "TRAY 2" can be designated as the feeding source of the sheets, only "TRAY 1" can be designated as the discharging destination of the sheets, and either "MONOCHROME" or "COLOR" can be designated as the color used in the printing operation. That is, the printer 11 of the MFP 10B is a color printer having two feed trays and one discharge tray. Further, the auto condition information shown in FIG. 3B indicates, as the execution condition of the printing operation according to the print instruction in which the execution condition is not defined, "TRAY 2>TRAY 1" is designated as the feeding source of the sheets, and "TRAY 1" is designated as the discharging destination of the sheets.

It is noted that the indication "TRAY 2>TRAY 1" of the feed tray information means that "TRAY 2" is given higher priority than "TRAY 1". That is, the MFP 10B executes the printing operation in accordance with the auto condition including the feed tray information of "TRAY 2" on condition that sheets are accommodated in the tray 2. Further, the MFP 10B executes the printing operation in accordance with the auto condition including the feed tray information of "TRAY 1" on condition that no sheets are accommodated in the tray 1.

The availability information indicates whether the MFP 10 is capable of executing an operation that meets the auto condition. In other words, the availability information indicates whether an auto condition can be set to the corresponding item. The availability information is assigned with a first value "ON" which indicates that the operation according to the auto condition can be executed, or a second value "OFF" which indicates that the operation according to the auto condition cannot be executed.

Accordingly, the MFP 10A and MFP 10B is capable of executing the printing operation in accordance with the auto condition when the print instruction in which the feed tray information and/or the discharge tray information is not instructed is received. On the other hand, the MFP 10 and the MFP 10B cannot execute the printing operation if the print instruction in which the color information is not instructed. The print instruction information in which the feed tray information is not instructed is, for example, the print instruction information in which a value to identify a feed tray is not set in the feed tray information. It is also noted that the MFP 10A and MFP 10B are configured to execute the printing operation in accordance with the auto condition when a value "AUTO" indicating the usage of the auto condition is set as the feed tray information included in the print instruction information.

The mobile terminal 50 mainly has a display 53, an input I/F 54, an NFC communication I/F 55, a Wi-Fi communication I/F 56, a CPU 61, a memory 62 and a communication bus 63. The display 53, the input I/F 54, the NFC communication I/F 55, the Wi-Fi communication I/F 56, the CPU 61, the memory 62 and the communication bus 63 provided to the mobile terminal 50 have substantially the same configuration of the display 23, the input I/F 24, the NFC communication I/F 25, the Wi-Fi communication I/F 26, the CPU 31, the memory 32 and the communication bus 33, respectively, and description thereof will be omitted for brevity. It is noted that the CPU 61 and the memory 62 are examples of a controller.

The mobile terminal 50 is, for example, a cellphone, a smartphone or a tablet terminal. Preferably, the mobile terminal 50 is configured such that the size of the display screen of the display 53 is equal to or less than 12 inches, and more preferably, equal to or less than eight inches. Further, it is also preferable that the input I/F 54 of the mobile terminal 50 is a touch sensor overlaid on the display screen of the display 53.

According to the illustrative embodiment, the program storage area 62A of the memory 62 is configured to store the OS 64 and the terminal program 65. The OS 64 is, for example, iOS®, Windows Phone® Operating System, and the like.

The terminal program 65 is a program which causes the designated device to execute a designated operation with respect to designated data. The designated data is image data designated by the user. The designated operation is an operation designated by the user. The designated device is, according to the embodiment, the MFP 10 designated by the user. The terminal program 65 is configured to receive the user operations to designate the designated data, the designated operation and the designated device. In the following description, data identification information for identifying the designated data will occasionally be referred as "designation data ID", operation identification information for identifying the designated operation will occasionally be referred to as "designated operation ID" and device identification information for identifying the designated device will occasionally be referred to as "designated device ID".

The data storage area 62B is configured to store designated device information as shown in FIG. 4A. When the terminal program 65 is installed in the terminal device 50, the designated device information is not stored in the data storage area 62B. The terminal program 65 stores the device information received from the MFP 10 in S24 and S39 (see FIGS. 5B and 6) in the data storage area 62B as the designated device information. The designated device information is the device information received from the designated device. Further, the device ID included in the designated device information is designated device ID. The auto condition information is the auto condition information obtained from the MFP 10 identified by the corresponding device ID.

The data storage area 62B is configured to store the device ID, the user condition information, the auto condition information, the history condition information in association with each other. Hereinafter, the entire information shown in FIG. 4B will be referred as a "history list". Further, a set of the device ID, the user condition information, the auto condition information and the history condition information, which are associated with each other, will be referred to as a history record. Thus, the history list is capable of including a plurality of records.

When the terminal program 65 is installed in the terminal device 50, the history records are not stored in the data storage area 62B. The terminal program 65 is configured to register a history record with the data storage area 62B every time the terminal device 50 transmits the print instruction information to the MFP 10. The device ID is the device ID of the MFP 10 which is the destination of the print instruction information. The user condition information is an execution condition designated by the user in S35-S37 (see FIG. 6) (hereinafter, referred to as a "user condition"). The auto condition information is auto condition information obtained from the MFP 10 identified by the corresponding device ID. The history condition information is the execution condition included in the print instruction information (hereinafter, referred to as "history information").

Further, the data storage area 62B may be configured that a data folder may be defined, in which, for example, photograph data, document data, presentation data, spreadsheet data or the like may be stored.

Throughout the specification, devices with which communication can be executed in accordance with the NFC standard are referred to as "NFC devices", and the communication which is executed in accordance with the NFC standard is referred to as the "NFC communication". That is, the MFP 10 and the mobile terminal 50 are examples of the NFC devices. It is noted that the MFP 10 and the mobile terminal 50 operate in one of a P2P (peer to peer) mode, a reader mode, a writer mode and a CE (card emulation) mode. Further, in the specification, the reader mode and the writer mode are collectively referred to as an "R/W mode" occasionally.

The P2P mode is a mode in which a pair of NFC devices execute a bidirectional communication. The R/W mode and the CE mode are modes in which a pair of NFC devices execute a unidirectional communication. The read mode is a mode in which information is retrieved from the NFC device currently operating in the CE mode. The write mode is a mode in which information is stored in the NFC device operating in the CE mode.

According to the illustrative embodiment, a case where the MFP 10 operates in the CE mode and the mobile terminal 50 operates in the R/W mode will be described. That is, in the illustrative embodiment, the mobile terminal 50 configured to operate in the R/W mode reads data and the like from the MFP 10 which operates in the CE mode and/or writes information and the like in the MFP 10. It is noted that aspects of the present disclosures need not be limited to the configuration of the illustrative embodiment, but can be modified in various ways. For example, the MFP 10 may be operate in the R/W mode, while the mobile terminal 50 may operates in the CE mode. Alternatively, both the MFP 10 and the mobile terminal 50 operate in the P2P mode.

The NFC I/F 55 of the mobile terminal 50 according to the illustrative embodiment is configured to execute a polling operation. The polling operation is an operation to output a polling signal repeatedly at a particular period, and monitor receipt of a response signal which is a response to the polling signal. The NFC communication I/F 25 of the MFP 10 according to the illustrative embodiment is configured to execute a listening operation. The listening operation is an operation to monitor receipt of the polling signal, and output a response signal in response to receipt of the polling signal.

As the MFP 10 and the mobile terminal 50 become close to each other, the NFC communication I/F 25 of the MFP 10 receives the polling signal output by the NFC communication I/F 55 of the mobile terminal 50, and the NFC communication I/F 55 of the mobile terminal 50 receives the response signal output by the NFC communication I/F 25 of the MFP 10. As a result, in accordance with a particular procedure according to the NFC standard, a communication link according to the NFC method (hereinafter, referred to as an NFC link) is established between the MFP 10 and the mobile terminal 50. Thereafter, the MFP 10 and the mobile terminal 50 transmits/receives information and the like through the NFC link.

Figure 5A:
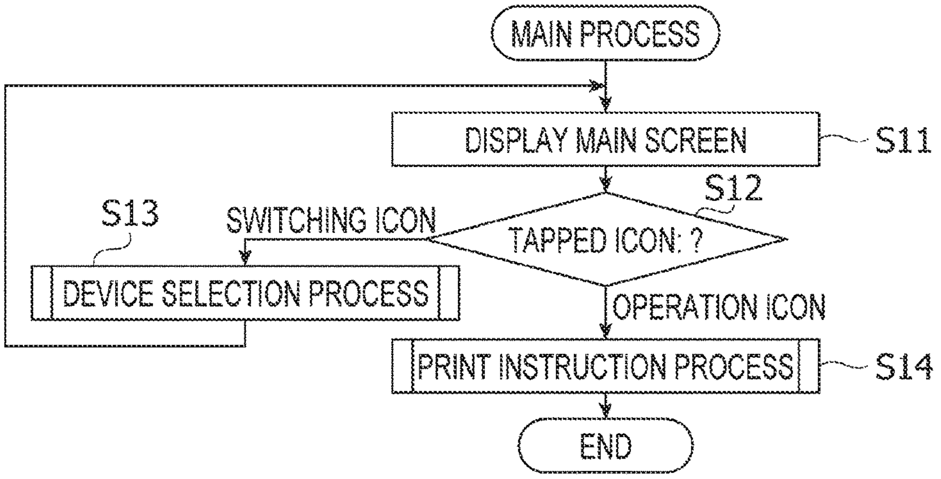
FIG. 5A is a flowchart illustrating a main process executed in the mobile terminal according to the illustrative embodiment of the disclosures.

Hereinafter, referring to FIGS. 5A, 5B, 6 and 7, an operation of the system 100 according to the illustrative embodiment will be described. It is assumed that, at a point of time when a process shown in FIG. 5A is started, the NFC communication I/F 25 of the MFP 10 has already been executing the listening operation, while the NFC communication I/F 55 of the mobile terminal 50 has not executed the polling operation. Further, at a point of time when the process shown in FIG. 5A is started, the designated device information has not been stored in the data storage area 62B of the mobile terminal 50. Still further, it is assumed that, at a point of time when the process shown in FIG. 5A is started, two history records shown in FIG. 4B have already been registered with the history list.

Figure 8A:
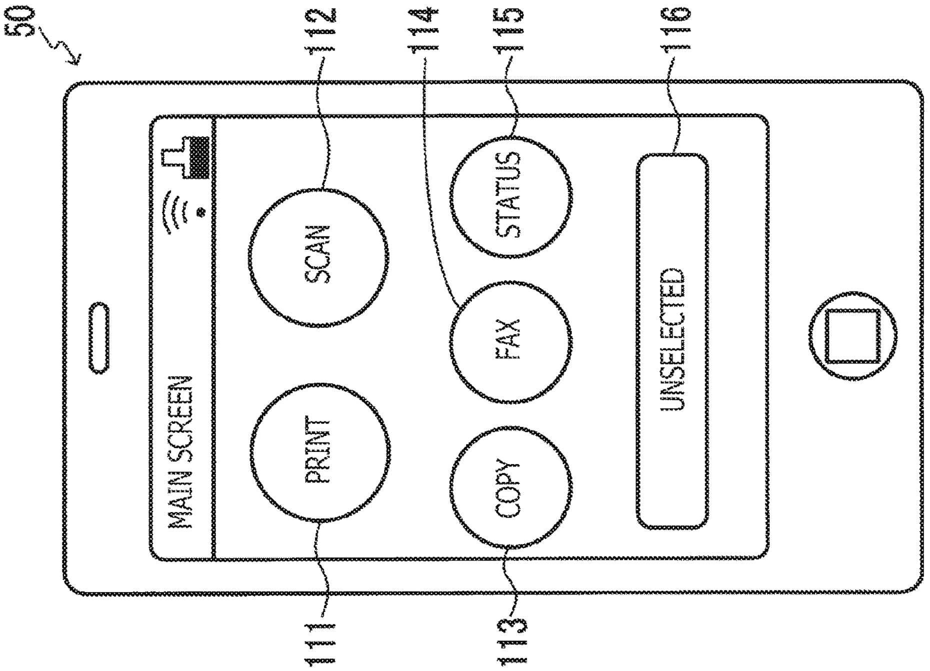
FIG. 8A is an example of a main screen displayed on a display of the mobile terminal according to the illustrative embodiment of the disclosures.

In response to invocation by the user, the terminal program 65 of the mobile terminal 50 starts a main process shown in FIG. 5A. The terminal program 65 causes the display 53 to display a main screen (S11). FIG. 8A shows an example of the main screen. The main screen shown in FIG. 8A includes operation icons 111, 112, 113 and 114, a status icon 115, and a switching icon 116. Then, the terminal program 65 waits for receipt of the user operation to the main screen through the input I/F 54 (S12).

The operation icon 111 corresponds to the printing operation, the operation icon 112 corresponds to the scanning operation, the operation icon 113 corresponds to the copying icon and the operation icon 114 corresponds to the facsimile operation. Further, the status icon 115 corresponds to an instruction to display a status screen which shows a status of the designated device. Since the status screen is not closely related to the aspects of the present disclosures, detailed description thereof will not be provided. The switching icon 116 corresponds to an instruction to switch the designated devices. It is noted that, on the switching icon 116 shown in FIG. 8A, a character string "UNSELECTED" is shown to indicate that not designated device is currently selected.

The terminal program 65 keeps displaying the main screen and operates in a standby state until a user operation with respect to the main screen is received through the input I/F 54. In response to receipt of the user operation of the switching icon 116 through the input I/F 54 (S12: switching icon), the terminal program 65 executes a device selection process (S13). The device selection process is an example of an instruction receiving operation in which the terminal program 65 receives, through the input I/F 54, a designating operation of the user to designate one of the multiple MFP's 10A and 10B, which are communicatable through the Wi-Fi communication I/F 55, as the designated device.

Figure 5B:
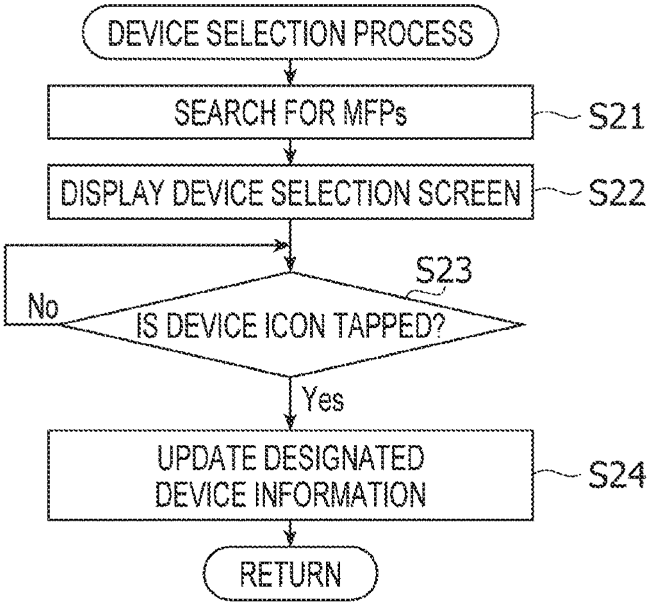
FIG. 5B is a flowchart illustrating a device selection process executed in the mobile terminal according to the illustrative embodiment of the disclosures.

Next, referring to FIG. 5B, the device selection process will be described. The terminal program 65 searches for multiple MFP's 10 which are communicatable with the mobile terminal through the Wi-Fi communication I/F 56 with use of, for example, an SNMP (simple network management protocol) (S21). Specifically, the terminal program 65 broadcasts transmission request information onto the communication network 101 through the Wi-Fi communication I/F 56. Next, the terminal program 65 receives, through the Wi-Fi communication network 56, the device information, which are transmitted by the MFP's 10A and 10B as responses to the transmission request information. That is, the terminal program 65 searches for the MFP's 10A and 10B, which are transmitting sources of the device information, as the MFP's capable of executing the wireless communication. It is noted that another well-known method may be employed to detect the MFP's 10 capable of executing the wireless communication.

Figure 8B:
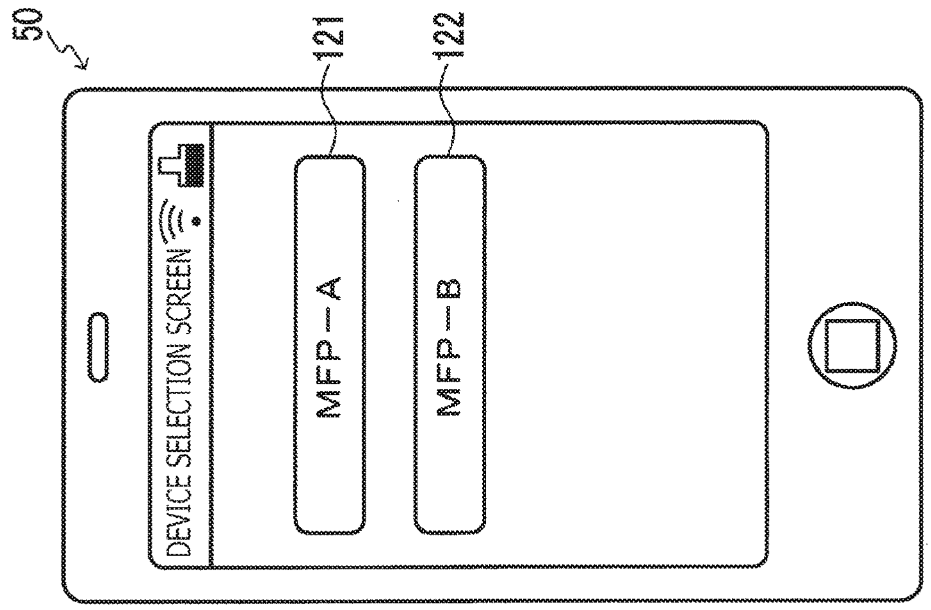
FIG. 8B is an example of a device selection screen displayed on the display of the mobile terminal according to the illustrative embodiment of the disclosures.

Next, the terminal program 65 displays the device selection screen on the display 53 (S22). FIG. 8B shows an example of the device selection screen, which include device icons 121 and 122. According to the illustrative embodiment, the device icons 121 and 122 respectively correspond to the MFP's 10A and 10B identified in S21. On the device icons 121 and 122, the device ID's of the corresponding MFP's 10A and 10B are indicated, respectively. The terminal program 65 is capable of receiving the user operation with respect to the device selection screen through the input I/F 54 (S23).

The terminal program 65 keeps displaying the device selection screen and operates in a standby state until the user operation on the device selection screen is received through the input I/F 54 (S23: NO). In response to receipt of the user operation to select, for example, the device icon 122 on the device selection screen through the input I/F 54 (S23: YES), the terminal program 65 stores the device information of the MFP 10B corresponding to the selected device icon 122 in the data storage area 62B as designated device information (S24). It is noted that, if the designated device information has already been stored in the data storage area 62B, the terminal program 65 overwrites the designated device information having been stored with the new designated device information. It is noted that the operation to designate a device icon is an example of a designated operation to designate the MFP 10.

As shown in FIG. 5A, the terminal program 65 executes steps S11 onwards using the designated device information, which is updated in the device selection process. That is, immediately after S13, in which the device icon 122 has been selected, the terminal program 65 displays the main screen including the switching icon 116 on which the device ID "MFP-B" is indicated on the display 53 (S11). Optionally, the main screen may be configured such that the operation icons 111-113, which correspond to the operations the MFP 10B can execute, are displayed, while the operation icon 114, which corresponds to the operation the MFP 10B cannot execute, is not displayed.

Next, in response to receipt of designation of one of the operation icons 111-114, which are displayed on the main screen, through the input I/F 54 (S12: operation icon), the terminal program 65 stores an operation ID, which corresponds to the designated operation icon, in the data storage area 62B as the designated operation ID, and executes an execution instruction process corresponding to the designated operation icon (S14). It is noted that the user operation to designate the operation icon is an example of the user operation to designate a designated operation.

Figure 6:
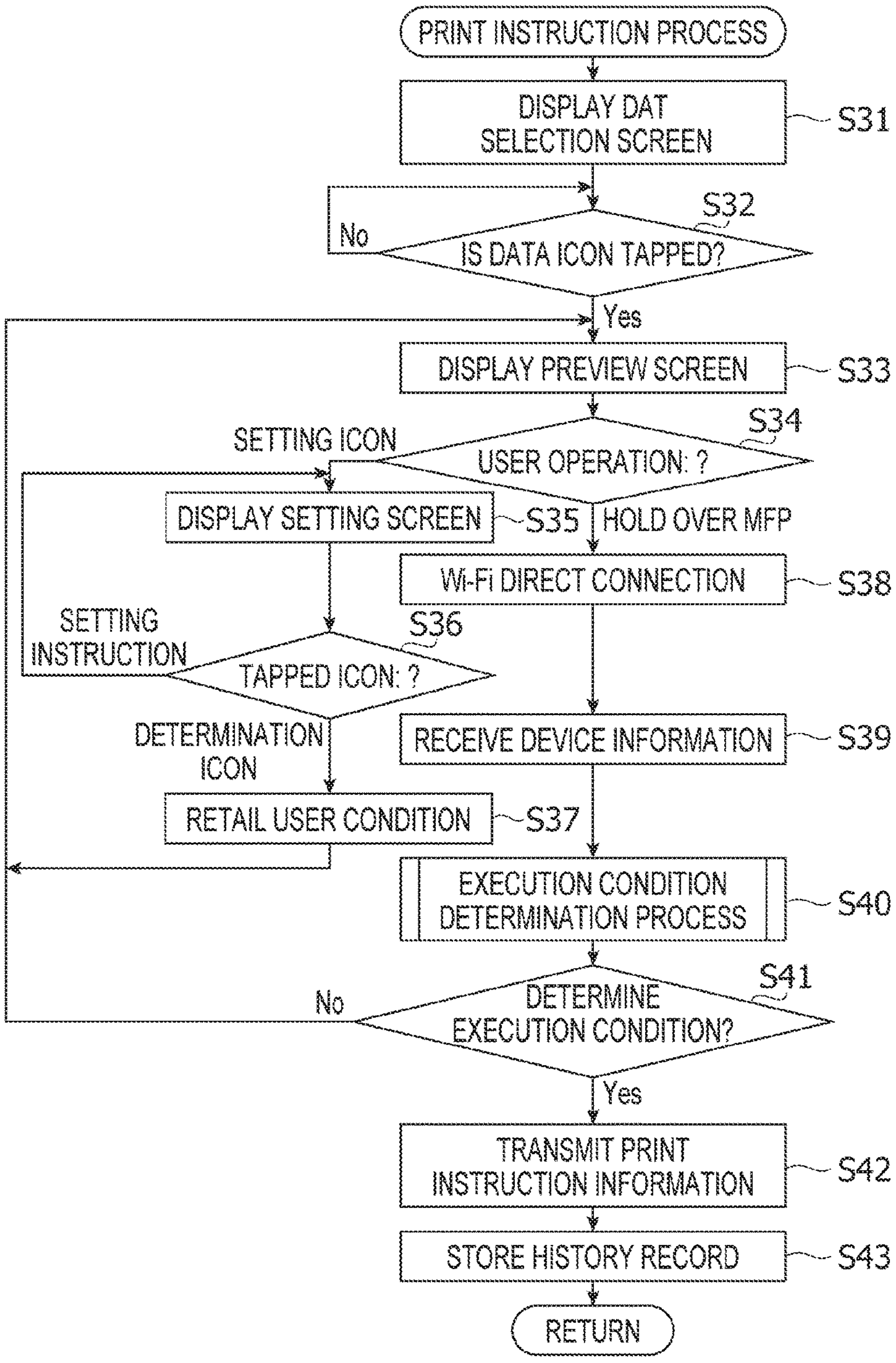
FIG. 6 is a flowchart illustrating a print instruction process executed in the mobile terminal according to the illustrative embodiment of the disclosures.
Figure 7:
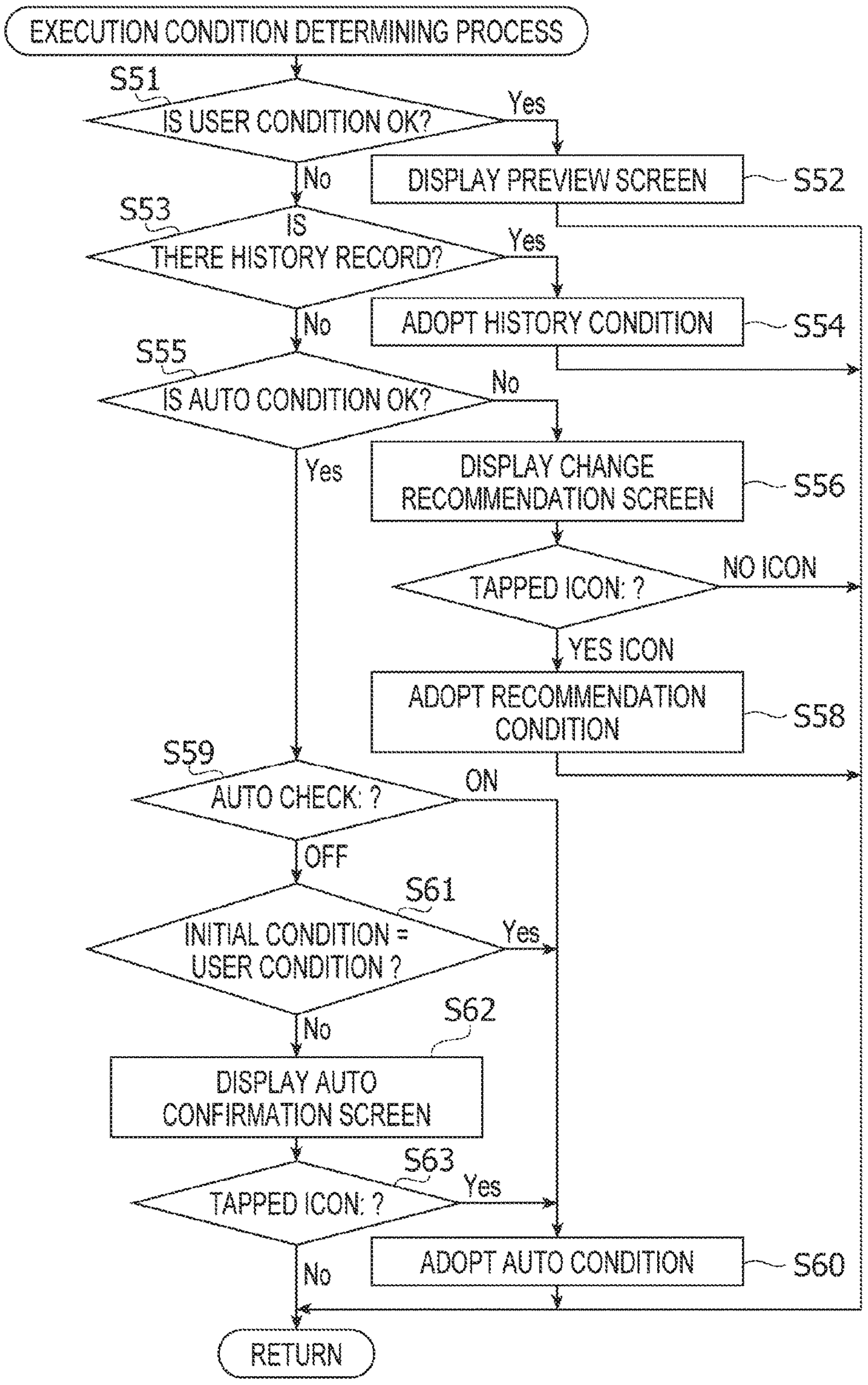
FIG. 7 is a flowchart illustrating an execution condition determining process executed in the mobile terminal according to the illustrative embodiment of the disclosures.

Next, a print instruction process show in FIG. 6 will be described as an example of the execution instruction process corresponding to the operation icon 111.

Figure 9B:
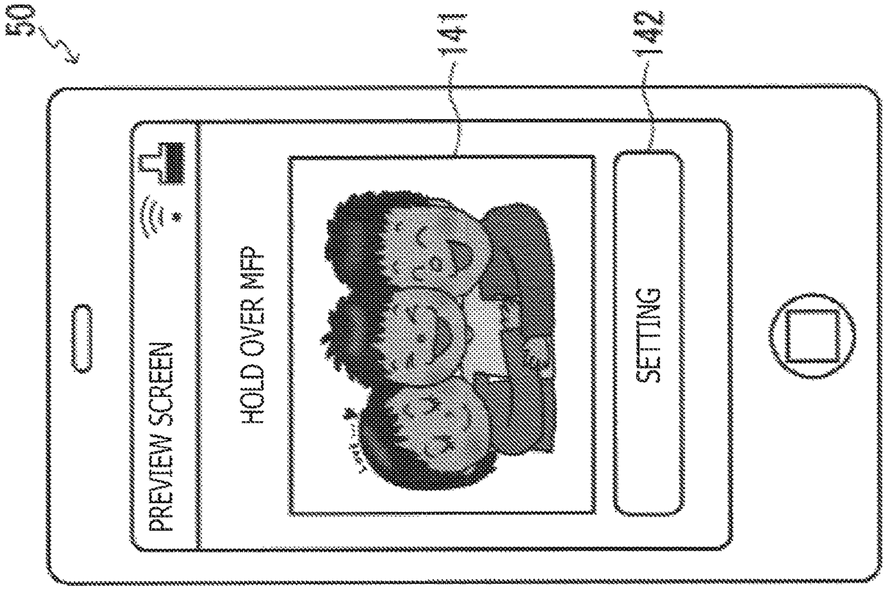
FIG. 9B is an example of a preview screen displayed on the display of the mobile terminal, when there is no designated device, according to the illustrative embodiment of the disclosures.
Figure 9A:
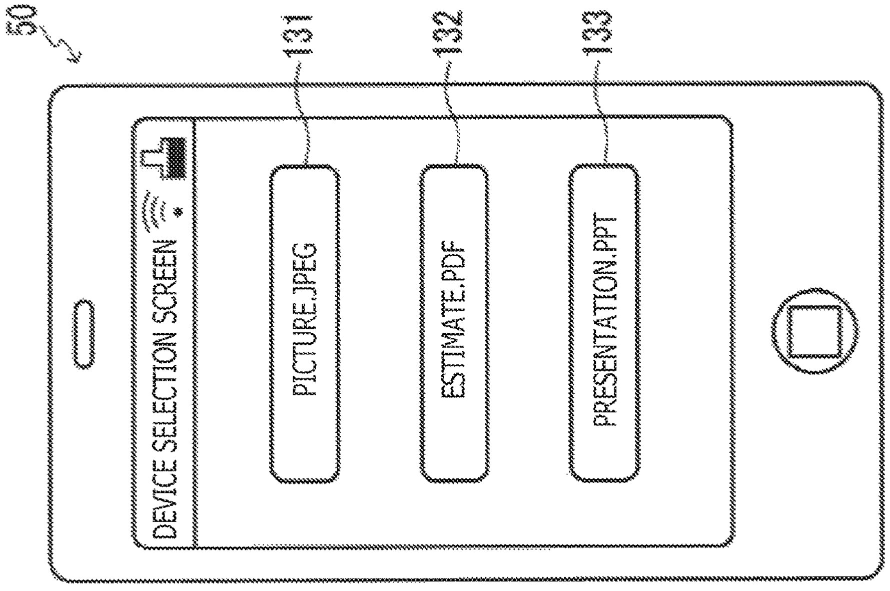
FIG. 9A is an example of a data selection screen displayed on the display of the mobile terminal according to the illustrative embodiment of the disclosures.

In the print instruction process, the terminal program 65 firstly displays the data selection screen on the display 53 (S31). FIG. 9A shows an example of the data selection screen. The data selection screen shown in FIG. 9A includes multiple data icons 131, 132 and 133. The data icons 131-133 correspond to, for example, various pieces of data stored in the data folder or various pieces of data stored in a not-shown server on the Internet. Then, the terminal program 65 receives the user operation with respect to the data selection screen through the input I/F 54 (S32).

The terminal program 65 keeps displaying the data selection screen and operates in a standby state until the user operation with respect to the data selection screen is received through the input I/F 54 (S32: NO). In response to receipt of the user operation with respect to the data selection screen through the input I/F 54 (S32: YES), the terminal program 65 determines the data "photo.jpeg" corresponding to the data icon 131 as the designated data. That is, the terminal program 65 temporarily stores the data ID "photo.jpeg" corresponding to the designated data icon 131 in the data storage area 62B as the designated data ID. It is noted that the user operation to designate the data icon 131 is an example of the user operation to designate the designated data.

Next, the terminal program 65 displays the preview screen on the display 53 (S33). FIG. 9B shows an example of the preview screen when the operation icon 111 is designated with designated device not being designated. The preview screen shown in FIG. 9B includes a message "hold over MFP", a preview image 141 and a "SETTING" icon 142. The preview image 141 is an image showing the execution result of the designating operation with respect to the designated data. That is, according to the illustrative embodiment, the preview image 141 shows an image by printing an image represented by the data "photo.jpeg" on the sheet. The "SETTING" icon 142 corresponds to an instruction to start inputting the user condition.

The terminal program 65 receives the user operation with respect to the preview screen through the input I/F 54 (S34). Further, the terminal program 65 causes the NFC communication I/F 55 to start the polling operation. That is, the NFC communication I/F 55 outputs the polling signal at every particular interval. The terminal program 65 keeps displaying the preview screen and operates in a standby state until it receives the response signal through the NFC communication I/F 55, or the user operation with respect to the preview screen through the input I/F 54.

Figure 10A:
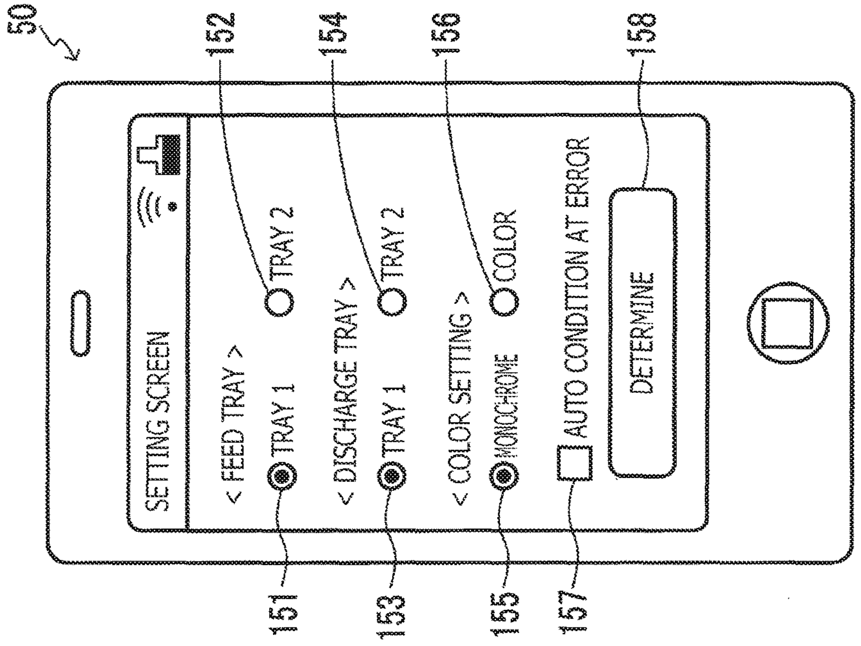
FIG. 10A is an example of a setting screen displayed on the display of the mobile terminal, when there is no designated device, according to the illustrative embodiment of the disclosures.

In response to receipt of designation of the "SETTING" icon 142 through the input I/F 54 (S34: setting icon), the terminal program 65 displays a setting screen on the display 53 (S35). FIG. 10A shows an example of the setting screen when the operation icon 111 is designated with the designated device not being designated. The setting screen includes multiple radio buttons 151, 152, 153, 154, 155 and 156, a checkbox 157 and "DETERMINE" icon 158. The terminal program 65 is configured to receive the user operation with respect to the setting screen through the input I/F 54 (S36).

According to the illustrative embodiment, the radio button 151 corresponds to the feed tray information "TRAY 1", the radio button 152 corresponds to the feed tray information "TRAY 2", the radio button 153 corresponds to the discharge tray information "TRAY 1", the radio button 154 corresponds to the discharge tray information "TRAY 2", the radio button 155 corresponds to the color information "MONOCHROME", the radio button 156 corresponds to the color information "COLOR", and the radio button 157 corresponds to an instruction to automatically employ the auto condition when the user condition is out of a range of the ability information. Further, the "DETERMINE" icon 158 corresponds to an instruction to determine the user condition.

FIG. 10A shows the setting screen when the designated device is not designated. That is, at a timing where the setting screen shown in FIG. 10A is displayed, since the designated device has not yet been designated, the terminal program 65 includes the radio buttons 151-156 corresponding to selection candidates of particular execution conditions. Thus, there exists a possibility that the setting screen shown in FIG. 10A includes the radio buttons 151-156, at least one of which corresponds to the execution condition that is out of the range of the ability information of the designated device which will be designated at a later time through the NFC communication.

In the example of the setting screen shown in FIG. 10A, the radio buttons 151, 153 and 155 are already checked. The execution condition indicated by the preliminary checked radio buttons 151, 153 and 155 is execution condition having been set in the terminal program 65 in advance (hereinafter, such a condition will be referred to as an "initial condition"). That is, the initial condition according to the illustrative embodiment includes the feed tray information of "TRAY 1", the discharge tray information of "TRAY 1" and the color information of "MONOCHROME".

The terminal program 65 keeps displaying the setting screen and operates in a standby state until the user operation with respect to the setting screen is received through the input I/F 54. In response to receipt of designation of one of the radio buttons 151-156 or the checkbox 157 through the input I/F 54 (S36: setting instruction), the terminal program 65 displays the setting screen on which the checking condition has been updated on the display 53 (S35). Further, in response to receipt of designation of "DETERMINE" icon 158 through the input I/F 54 (S36: determine icon), the terminal program 65 determines the execution condition defined by the checked radio buttons 151-156 as the user condition. Then, the terminal program 65 temporarily stores the user condition information representing the user condition in the data storage area 62B (S37). The terminal program 65 also temporarily stores information indicating whether the checkbox 157 is checked or not in the data storage area 62B.

It is noted that the process of S25-S27 is an example of a condition reception process to receive the input of the user condition. Checking of the checkbox 157 is an example of a third instruction operation to instruct to automatically employ the auto condition when the user condition is out of the range of the ability information.

The terminal program 65 displays the preview screen on the display 53 (S33). When the process in steps S38 onwards is to be executed with the "SETTING" icon 142 shown in FIG. 9A not being designated, or when the "SETTING" icon 158 is designated with the checked statuses of the radio buttons 151-155 in FIG. 10A not being changed, the terminal program 65 determines the initial condition as the user condition, and executes the following process.

Next, the terminal program 65 receives the response signal, for example, from the MFP 10A through the NFC communication I/F 55 which is executing the polling operation as the user holds the mobile terminal 50 over the MFP 10A (S34: hold over). Then, the terminal program 56 establishes an NFC link with the MFP 10 which is the transmission source of the response signal. It is noted that a state where the terminal program 56 receives the response signal from the MFP 10A is an example of a state where the NFC communication through the NFC communication I/F 55 becomes available. Further, receiving the response signal from the MFP 10A, or establishing the NFC link with the MFP 10A is an example of an identifying process to identify the MFP 10A as the designated device. Further, the user operation to hold the mobile terminal 50 over the MFP 10A is an example of an operation to designate the MFP 10A as the designated device, or an operation to instruct the MFP 10A to execute the printing operation.

Next, the terminal program 65 receives connection information from the MFP 10A through the thus established NFC link. It is noted that the process of receiving the connection information is an example of a connection information receiving process. The connection information is necessary to for Wi-Fi direction connection with the MFP 10A. The connection information may be an IP (internet connection) address, MAC (media access control) address or an SSID (service set identifier) and the like. Then, the terminal program 65 establishes the Wi-Fi direct connection with the MFP 10A using the received connection information (S38). The terminal program 65 causes the NFC communication I/F 55 to terminate the polling operation.

Next, the terminal program 65 receives the device information from the MFP 10A through the Wi-Fi communication I/F 56 with which the Wi-Fi direction connection has been established (S39). Then, the terminal program 65 stores the device information received in S39 in the data storage area 62B as the designated device information. It is noted that the process in S39 is an example of the first receiving process to receive the ability information and the second receiving process to receive the auto condition information and the availability information. It is noted that the terminal program 65 may be necessary to receive at least the ability information from the MFP 10A.

Next the terminal program 65 executes the execution condition determining process (S40). The execution condition determining process is a process to determine the execution condition of the printing operation which is to be executed by the MFP 10A which is the designated process.

It is noted that, in the description of the execution condition determining process below, it is assumed that the MFP 10A has been designated and the first user condition (the feed tray information "TRAY 1", the discharge tray "TRAY 2", the color information "MONOCHROME"), the second user condition (the feed tray information "TRAY 1", the discharge tray "TRAY 1", the color information "COLOR"), the third user condition (the feed tray information "TRAY 1", the discharge tray "TRAY 2", the color information "COLOR"), or the fourth user condition (the feed tray information "TRAY 2", the discharge tray "TRAY 2", the color information "MONOCHROME") has been input.

In the execution condition determining process, the terminal program 65 determines whether the user conditions input in S35-S37 fall within the range of the ability information received from the MFP 10A in S39 (S51). It is noted that the recitation "the user conditions fall within a range of the ability information" means, for example, the execution condition represented by the ability information includes the user condition. In other words, the above recitation means that it is possible to cause the designated device to execute the printing operation. It is noted that the process at S51 is executed for each of multiple items included in the execution condition. Further, the step S51 is an example of the first determining process.

The terminal program 65 determines that, if the first user condition is input as the user condition, it is within the range of the ability information of the MFP 10A (S51: YES). In this case, the terminal program 65 determines to make the MFP 10A execute the printing operation in accordance with the first user condition (S52). If the second user condition or the third user condition is input as the user condition, the terminal program 65 determines that the color information "COLOR" is out of the range of the ability information of the MFP 10A (S51: NO). Further, if the fourth user condition is input as the user condition, the terminal program 65 determines that the feed tray information "TRAY 2" is out of the range of the ability information of the MFP 10A (S51: NO).

Next, the terminal program 65 determines whether the history record(s) is registered in the history list (S53) in response to the determination that the user condition is out or the range of the ability information of the MFP 10A. It is noted that, for example, the terminal program 65 may determine whether there exists a history record including the designated device ID from among the history records registered with the history list. Alternatively, the terminal program 65 may determine whether there exists a history record including the user condition information representing the user condition. Further, the terminal program 65 may combine the above determination operations. It is noted that the process at S53 is an example of the process in the fourth determination process.

The terminal program 65 determines that there exists a history record including the designated device ID "MFP-A" and the user condition information indicating the second user condition (S53: YES). At this stage, the terminal program 65 determines to make the MFP 10A execute the printing operation in accordance with the history condition indicated by the history condition information (i.e., the feed tray information "TRAY 1", the discharge tray information "TRAY 1" and the color information "MONOCHROME") (S54). If the third user condition or the fourth user condition is input as the user condition, the terminal program 65 determines that no history record including the user condition information indicating the user condition exists (S53: NO).

Next, the terminal program 65 examines the setting value of the availability information, from among the availability information included in the designated device information, corresponding to the item of the user condition out of the range of the ability information (S55) in response to determination that no history record to extract exists (S53: NO). When the third user condition is input as the user condition, the terminal program 65 determines that the availability information corresponding to the color information "COLOR" is the second value "OFF" (S55: NO). If the fourth user condition is input as the user condition, the terminal program 65 determines that the availability information corresponding to the feed tray information "TRAY 2" is the first value "ON" (S55: YES). It is noted that the process in S55 is an example of a second determining process.

Next, in response to determination that, regarding at least one item of which the availability information is out of the range, when it is determined that the corresponding user condition is determined to be the second value "OFF" (S55: NO), the terminal program 65 displays a change recommendation scree, which is an example of a first screen, on the display 53 (S56).

Figure 10B:
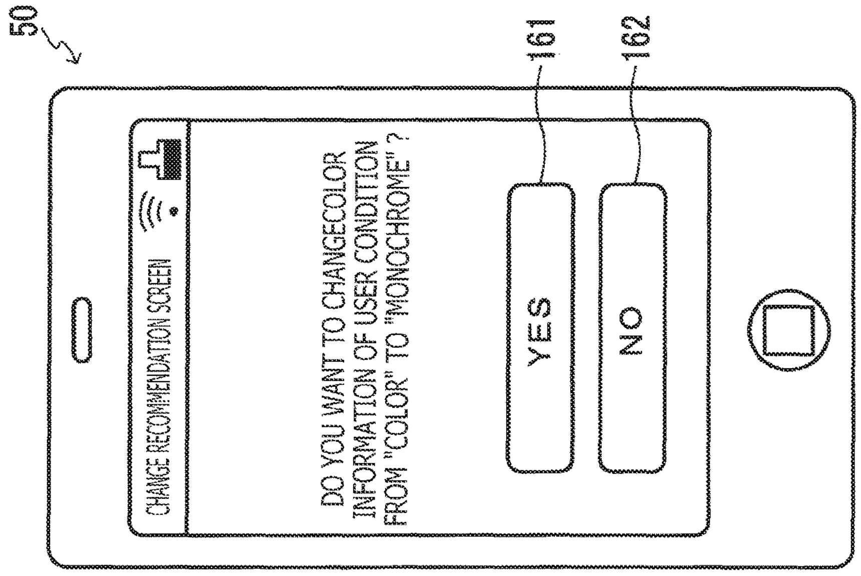
FIG. 10B is an example of a change recommendation screen displayed on the display of the mobile terminal according to the illustrative embodiment of the disclosures.

FIG. 10B shows an example of the change recommendation screen corresponding to the third user condition. The change recommendation screen shown in FIG. 10B includes a message "Do you want to change color information of user condition from 'color' to 'monochrome'?", a "YES" icon 161 and a "NO" icon 162. In S57, the terminal program 65 receives a user operation with respect to the change recommendation screen through the input I/F 54. It is noted that the process in S56 is an example of the first displaying process, and the process in S57 is an example of a first receiving process.

The message included in the change recommendation screen indicates a recommended condition which is a modification of the third user condition modified to fall within the range of the ability information. That is, the change recommendation screen shown in FIG. 10B notifies that the recommended condition will fall within the range of the ability information of the MFP 10A by changing the color information of the third user condition from "COLOR" to "MONOCHROME". In other words, the terminal program 65 generates a modified condition (i.e., the feed tray information "TRAY 1", the discharge tray information "TRAY 2" and the color information "MONOCHROME") in which the color information of the third user condition has been changed based on the ability information received in S39.

The terminal program 65 keeps displaying the change recommendation screen until the user operation with respect to the change recommendation screen is received through the input I/F 54. In response to receipt of designation of the "YES" icon 161 through the input I/F 54 (S57: "YES" icon), the terminal program 65 determines to make the MFP 10A execute the printing operation in accordance with the generated recommended condition (S58). It is noted that the user operation to designate the "YES" icon 161 is an example of the instruction operation to instruct changing of a condition to a recommended condition. In response to designation of the "NO" icon 162 through the input I/F 54 (S57: "NO" icon), the terminal program 65 terminates the execution condition determining process without determining the execution condition.

In response to determination that the availability information is the first value "ON" for all the items of which user conditions are out of the range of the ability information (S55: YES), the terminal program 65 determines whether the check box 157 in the setting screen has been checked, that is, whether a third instruction operation has been received in the condition receiving process (S59).

In response to determination that the check box 157 is checked (S59: ON), the terminal program 65 determines to make the MFP 10A execute the printing operation in accordance with the auto condition, without executing the process in S61-S63 (S60). For example, when the fourth user condition is input, the execution condition is determined such that the terminal program 65 replaces the feed tray information "TRAY 2" and the discharge tray information "TRAY 1" of which availability information is the first value "ON" with "AUTO", while the color information "MONOCHROME" of which availability is the second value "OFF" is remained as it is.

Further, in response to determination that the checkbox 157 is not checked (S59: NO), the terminal program 65 determines whether the user condition and the initial condition are identical (S61). It is noted that the process in S61 is an example of the determination process. Then, in response to determination that the user condition is equal to the initial condition (S61: YES), the terminal program 65 execute the process in S60 without executing the process of S62 and S63.

Figure 11B:
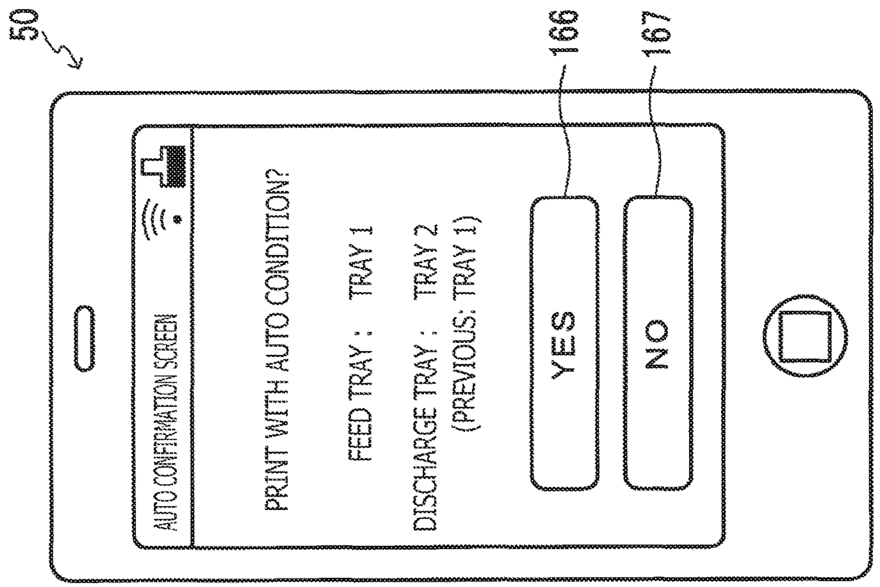
FIG. 11B is an example of an auto confirmation screen displayed on the display of the mobile terminal, when the most recent auto condition information is not coincide with the auto condition information in the past, according to the illustrative embodiment of the disclosures.
Figure 11A:
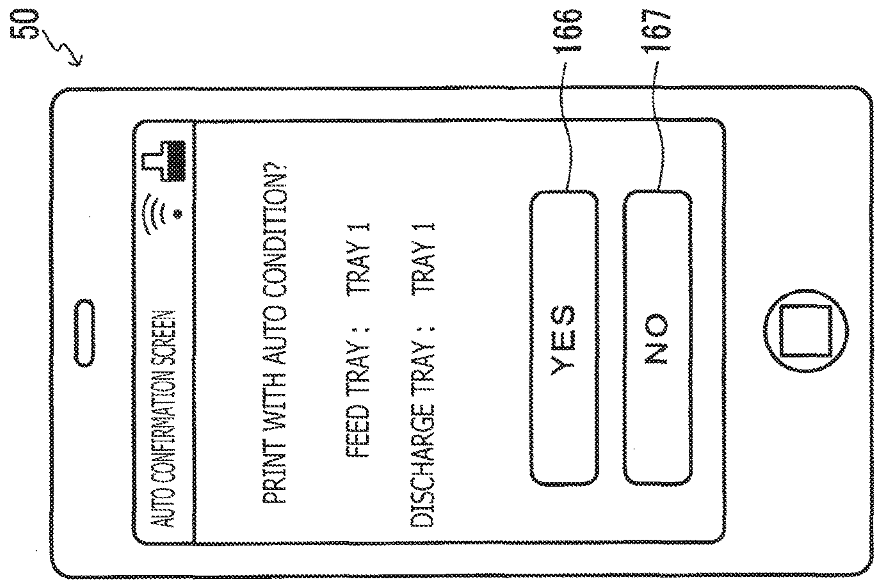
FIG. 11A is an example of an auto confirmation screen displayed on the display of the mobile terminal, when most recent auto condition information is coincide with the auto condition information in the past, according to the illustrative embodiment of the disclosures.

When the fourth user condition is input as the user condition, in response to determination that the fourth user condition is not equal to the initial condition (S61: NO), the terminal program 65 displays the auto confirmation scree, which is an example of the second screen, on the display 53 (S62). FIGS. 11A and 11B show examples of the auto confirmation screens. As shown in FIGS. 11A and 11B, each of the auto confirmation screens includes a message "PRINT WITH AUTO CONDITION?", the auto condition of the MFP 10A, a "YES" icon 166 which is an example of a first object, and a "NO" icon 167 which is an example of a second object. Then, the terminal program 65 receives the user operation with respect to the auto confirmation screen through the input I/F 54 (S63). It is noted that the process in S62 is an example of a second displaying process, and the process in S63 is an example of a second receiving process.

The terminal program 65 may differentiate the contents of the auto confirmation screen depending on whether the auto condition information of the designated device is coincide with the auto condition information in the history record including the designated device ID "MFP-A" or not. It is noted that the auto condition of the designated device information is an example of the auto condition information received in the most recent second reception process. Further, the auto condition information of the history record is an example of the auto condition information in the past.

For example, as indicated in FIG. 11A such that "feed tray: TRAY 2; discharge tray: TRAY 2", the auto condition information of the designated device may be incorporated in the auto confirmation screen in response to the auto condition information of the designated device being coincident with the auto condition information of the history record. On the other hand, in response to the auto condition information of the designated device information not being coincident with the auto condition information of the history record, the auto condition information of the designated device is incorporated in the auto confirmation screen such that "feed tray: TRAY 1; discharge tray: TRAY 2" as indicated in FIG. 11B, and an item indicating that items which do not coincide with each other between the most recent auto condition and the auto condition in the past are clearly indicated. It is noted that, in the auto confirmation screen shown in FIGS. 11A and 11B, only the trays which are given priority are explicitly indicated as the setting values of the discharge tray.

The terminal program 65 keeps displaying the auto confirmation screen and operates in a standby state until the user operation with respect to the auto confirmation screen is received through the input I/F 54. In response to receipt of designation of the "YES" icon 166 through the input I/F 54 (S63: YES icon), the terminal program 65 executes the process in S60. In response to receipt of designation of the "NO" icon 167 through the input OF 54 (S63: NO icon), the terminal program 65 terminates the execution condition determining process without determining the execution condition. It is noted that designation of the "YES" icon 166 is an example of the first instruction operation corresponding to the instruction to execute the printing operation according to the auto condition. Further, designation of the "NO" icon 167 is an example of the second instruction operation corresponding to an instruction not to execute the printing operation according to the auto condition.

Returning to FIG. 6, the terminal program 65 determines whether the execution condition has been determined in the execution condition determining process (S41). That is, the terminal program 65 determines that the execution condition has not been determined (S41: NO) in response to designation of the "NO" icon 162 or 167 in the change recommendation screen or the auto confirmation screen, and execute steps S33 onwards. It is noted that the terminal program 65 may display a message "Re-set the execution condition" or the like on the display 53 before displaying the preview screen on the display 53.

In response to execution of S52, S54, S58 and S60, the terminal program 65 determines that the execution condition has been determined (S41: YES). Then, the terminal program 65 transmits the print instruction information to the MFP 10A through the Wi-Fi communication I/F 56 through which the mobile terminal 60 and the MFP 10A are connected with a Wi-Fi direction connection (S42). The print instruction information is information which causes the MFP 10 to execute the printing operation in accordance with the determined execution condition. It is noted that the printing instruction information may include, for example, the designation data designated in S32 and the condition information indicating the execution condition determined in S40.

For example, the print instruction information when the first user condition is determined in S52 is an example of the first printing instruction information which includes the feed tray information "TRAY 1", the discharge tray information "TRAY 2" and the color information "MONOCHROME" as the condition information. Further, the process in S52 and S42 is an example of the first execution instruction process. For another example, the print instruction information when the auto condition is determined in S60 is an example of the second print instruction information including the feed tray information "Auto", the discharge tray information "Auto" and the color information "MONOCHROME" as the condition information. Further, the process in S60 or S42 is an example of the second execution instruction process.

For another example, the print instruction information when the recommended condition is determined in S58 is an example of the third printing instruction information including a condition: the feed tray information "TRAY 1", the discharge tray information "TRAY 1" and the color information "MONOCHROME" as the condition information. Further, the process in S58 and S42 is an example of the third execution instruction process. For further example, the print instruction information when the history information is determined in S54 is an example of a fourth print instruction information including a condition: the feed tray information "TRAY 1", the discharge tray information "TRAY 1" and the color information "MONOCHROME" as the condition information. Further, the process in S54 and S42 is an example of a fourth execution process.

On the other hand, although not shown, a device program 35 of the MFP 10A receives the print instruction information from the mobile terminal 50 through the Wi-Fi communication I/F 25, which is connected according to the Wi-Fi direction connection. Then, the device program 35 makes a printer 11 execute a printing operation in accordance with the received print instruction information. That is, the printer 11 records (prints) an image represented by data "PHOTO-.JPEG" included in the print instruction information on a sheet in accordance with the execution condition indicated by the condition information included in the print instruction information. For example, the printer 11 which received the first print instruction information mentioned above feeds the sheet from the feed tray 1, records the image represented by the designated data on the sheet with one color of black, and discharges the sheet on which the image was recorded onto the discharge tray 2.

Next, the terminal program 65 registers a new history record with the history list (S43). Specifically, the terminal program 65 registers the designated device ID, the user condition information indicating the user condition input in S35-S37, the auto condition information received in S29 and the history condition information indicating the execution condition determined in S40 with the history list.

For example, the terminal program 65 may additionally register a new history record in the history list. Alternatively, the terminal program 65 may overwrite a new history record on the history record which has already been registered with the history list. In this case, the new history record may be overwritten on the history record having the same device ID as the new history record has. It is noted that a process in S43 is an example of the storage process.

Next, a process when an operation icon 111 is designated with the MFP 10B being designated as the designated device will be described. Hereinafter, description of processes which are common with the previously described process will be omitted, and different processes will be mainly described. It is noted that the terminal program 65 is configured to display a preview screen shown in FIG. 12A on the display 53 in S33.

Figure 12A:
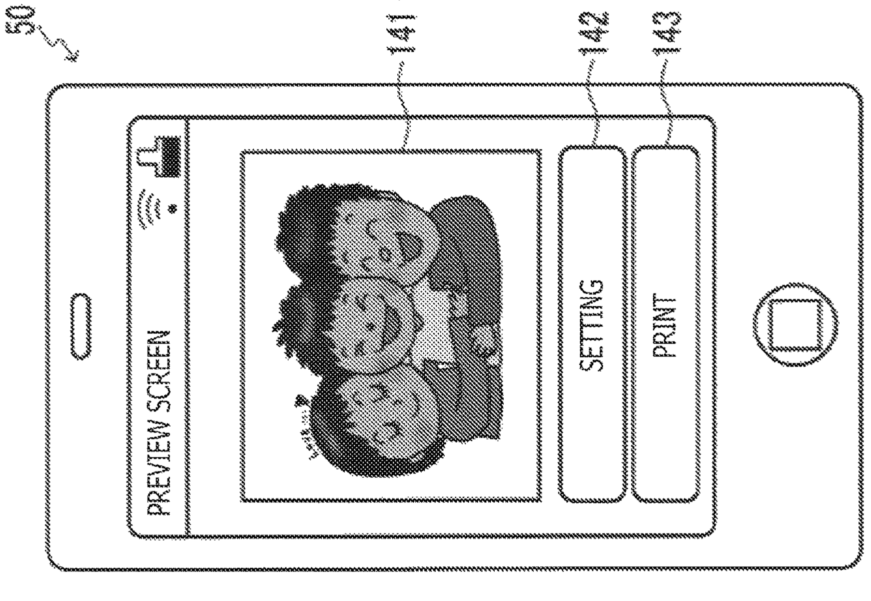
FIG. 12A is an example of a preview screen displayed on the display of the mobile terminal, when a designated device has been designated, according to the illustrative embodiment of the disclosures.

The preview screen shown in FIG. 12A is different from the preview screen shown in FIG. 9B in that the message "Hold over MFP" has been omitted from the preview screen shown in FIG. 12A and a "PRINT" icon 143 has been added on the preview screen shown in FIG. 12A. The "PRINT" icon 143 corresponds to an instruction to cause the designated device to execute the printing operation. Further, the terminal program 65 does not make the NFC communication I/F 55 start the polling operation in S34.

Figure 12B:
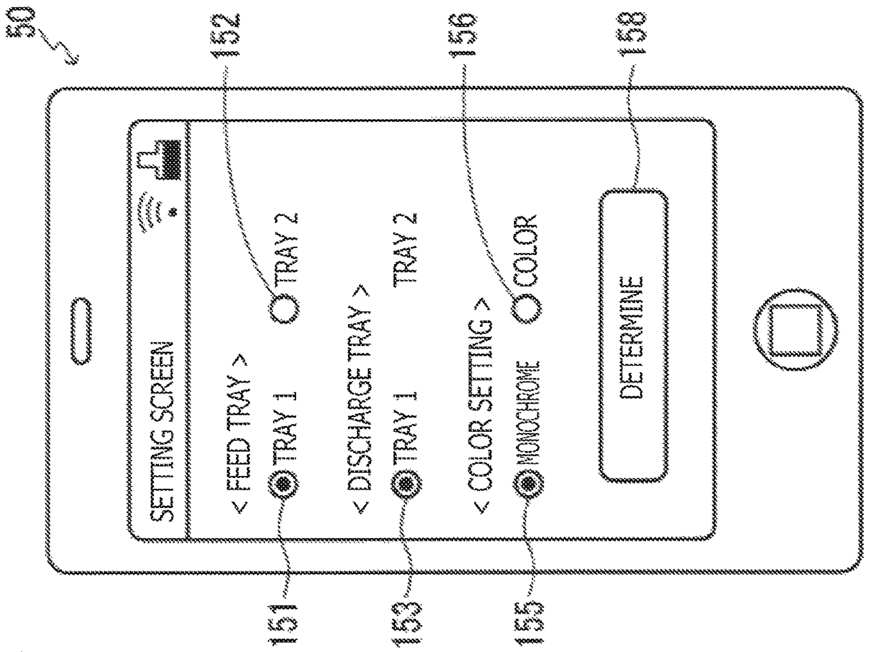
FIG. 12B is an example of a setting screen displayed on the display of the mobile terminal, when the designated device has been designated, according to the illustrative embodiment of the disclosures.

In response to receipt of designation of the "SETTING" icon 142 through the input I/F 54 (S34: Setting icon), the terminal program 65 displays the setting screen shown in FIG. 12B on the display 53 (S35). The setting screen shown in FIG. 12B includes the radio buttons 151, 152, 153, 155 and 156 which are stored in the data storage area 62B in S24. That is, the setting button shown in FIG. 12B is different from the setting screen shown in FIG. 10A in that the radio button 154 has been omitted in the setting screen shown in FIG. 12B.

In response to receipt of designation of the "PRINT" icon 143 through the input I/F 54, the terminal program 65 executes the process of S42 without executing S38-S41. When the condition receiving process is executed with the designated device having been designated in advance, designation of the user condition can be done within the range of the ability information. Therefore, it is not necessary to determine whether the user condition falls within the range of the ability information. That is, in the print instruction information in the above case includes the designated data designated in S32 and the user condition input in steps S35-S37.

The terminal program 65 is capable of receiving the user's input of the user condition through the setting screen before the designated device is designated. Accordingly, it is preferable that the setting screen shown in FIG. 10A includes all the selectable items of the execution conditions which can be designated in various MFP's 10A and 10B (i.e., the radio buttons 151-156). In other words, the setting screen shown in FIG. 10A includes the radio buttons 152 and 156 corresponding to the execution conditions which are out of range of the ability information of the MFP 10A, and the radio button 154 corresponding to the condition which is out of the range of the ability information of the MFP 10B. Therefore, there is a possibility that the user conditions input in S35-S37 become out of the range of the ability information of the designated device, which is designated later.

According to the illustrative embodiment, before the print instruction information is transmitted to the designated device, it is determined whether the input user condition is within the range of the ability information of the designated device. Then, when the user condition is within the range of the ability information, the first execution instructing process is executed. That is, when the first user condition is input, the printing operation is executed in accordance with the first user condition. On the other hand, when the user condition is out of the range of the ability information and the availability information has the first value, the second execution instructing process is executed. That is, when the fourth user condition is input, the printing operation is executed in accordance with the execution condition in which the feed tray information and the discharge tray information have been replaced with "Auto". As a result, it is possible to make the designated device, which is recognized with the near field communication, execute operations with respect to the image data in accordance with appropriate execution conditions.

Further, according to the illustrative embodiment, it is possible to encourage the user to determine whether the designated device is to be operated in accordance with the auto condition through the auto confirmation screen. Further, through the auto confirmation screen, it is possible to make the user confirm the current auto condition. Furthermore, it is possible to confirm the changed portions of the auto condition through the auto confirmation screen. Therefore, it is possible to make the designated device operation in accordance with the execution condition desired by the user.

By receiving the check of the checkbox 157 in advance, the second execution instruction process can be executed with skipping the process of S61-S63. Further, if the user inputs the user condition same as the initial condition, it is assumed that the user may not have any specific desires regarding the user condition. Therefore, when the initial condition and the user condition are coincide with each other, the second execution instruction process may be executed with skipping S62 and S63. With this configuration, the designated device can be controlled to operate in accordance with an appropriate execution condition with simplifying the user operation.

According to the above-described embodiment, when the second value "OFF" is set to the availability information which corresponds to an item out of the range of the ability information, a recommended condition is presented to the user through the change recommendation screen. Then, in response to the change to the recommended condition by the user, the third execution instruction process is executed. That is, when the third user condition mentioned above is input, the printing operation is executed in accordance with the execution condition in which the color information has been changed from "COLOR" to "MONOCHROME". With this configuration, the designated device can be controlled to operate in accordance with the appropriate execution condition.

It is noted that the terminal program 65 may display an error screen which notifies that the designated device may not be controlled to execute the operation instead of execution of S56-S58. Such a process is an example of the error process. Then, the terminal program 65 may terminate the execution condition determining process without determining the execution condition.

According to the illustrative embodiment, the fourth execution instruction process is executed when the history list contains the history record. That is, when the second user condition is input, the printing operation is executed in accordance with the history condition of the history record at the first line of the list shown in FIG. 4B. As in this case, by causing the designated device to operate in accordance with the history condition which was actually used in the past, it becomes possible to make the designated device operate in accordance with the appropriate execution condition. In such a case, by searching for a history record using the designated device ID and the user condition as search keys, a more appropriate execution condition can be determined. It is noted that only one of the designated device ID and the user condition may be used as a search key.

Further, according to the illustrative embodiment, when the designated device is identified with use of the near field communication, the process in S38-S41 is executed. On the other hand, when the designated device is designated in S13, the process in S38-S41 is skipped, and the first execution instruction process is executed. With this configuration, depending on the designation method of the designated device, the designated device can be controlled to operate in accordance with the appropriate execution condition.

It is noted that the interface through which the MFP 10 and the mobile terminal 50 communicate in S21, S39 or S42 need not be limited to the described configuration. Further, the information received in S21 and/or S39 may be part of the device information. For example, the terminal program 65 may receive only the device ID and the ability information from the MFP 10 in S21 and S39. Further, the terminal program 65 may receive the auto condition and the availability information from the MFP 10 immediately before execution of S55.

According to the illustrative embodiment, the processes described above are executed as the CPU's 31 and 61 executes various programs stored in the program storage areas 32A and 62A of the memories 32 and 62 of the MFP 10 and the mobile terminal 50, respectively. It is noted that such a configuration is only an example, and may be modified in various ways without departing from the aspects of the disclosures. That is, a part of or all of processes executed by controllers, which executes programs, may be alternatively realized by hardware such as an integrated circuit.

Further, the disclosures relate to the processes realized by the MFP's 10 and the mobile terminal, the aspects of the disclosures may be provided as programs which cause the MFP's and the mobile terminal to execute the processes. Such programs may be stored in a non-transitory recording medium and distributed. The non-transitory recording medium may include a CD-ROM, a DVD-ROM, and further a memory which is implemented to a server connectable to the MFP 10 and/or the terminal device 50 through the communication network 101. The program stored in the memory of the server may be distributed through the communication network such as the Internet as information or signal representing the program.

What is claimed is:

1. A non-transitory recording medium of a mobile terminal having a controller, a first communication interface, a second communication interface and an input interface, the non-transitory recording medium storing computer-readable instructions, the first communication interface being configured to execute a near field communication, the second communication interface being configured to execute a wireless communication, the second communication interface having a communicatable range being wider than that of the first communication interface, the instructions, when executed by the controller, cause the mobile terminal to:

execute a condition reception process to receive a user condition through the input interface, the user condition being an execution condition of an operation with respect to image data executed by an image processing apparatus, execute an identifying process to identify the image processing apparatus communicatable through the first communication interface as a designated device;

execute a first receiving process to receive ability information of the designated device from the designated device through one of the first communication interface and the second communication interface;

execute a second receiving process to receive availability information indicating whether the designated device is configured to execute the operation according to a device condition from the designated device through one of the first communication interface and the second communication interface, the availability information having one of a first value and a second value, the first value indicating that the designated device is configured to execute the operation according to the device condition, the second value indicating that the designated device is not configured to execute the operation according to the device condition, the device condition being the execution condition determined by the designated device;

determine, in a first determination process, whether the user condition falls within a range of the ability information;

execute a first execution instruction process to transmit first execution instruction information to the designated device through the second communication interface in response to determination that the user condition falls within the range of the ability information, the first execution instruction information being information to instruct execution of the operation according to the user condition;

determine, in a second determination process, whether the availability information is the first value or the second value in response to determining that the user condition is out of the range of the ability information; and execute a second execution instruction process to transmit second execution instruction information to the designated device through the second communication interface in response to determining that the availability information is the first value, the second execution instruction information being information instructing execution of the operation according to the device condition, and wherein the instructions, when executed by the controller, further cause the mobile terminal to:

execute a second reception process to receive one of a first instruction operation corresponding to execution of the operation according to the device condition and a second instruction operation corresponding to non-execution of the operation according to the device condition through the input interface in response to determining in the second determination process that the availability information is the first value;

execute the second execution instruction process in response to receipt of the first instruction operation in the second reception process;

enable receipt of a third instruction operation instructing to employ the device condition automatically when the received user condition is out of the ability information in the condition reception process;

execute the second reception process in response to determining that the availability information is the first value and determining that the third instruction operation is not received; and execute the second execution instruction process without executing the second reception process in response to determining in the second determination process that the availability information is the first value and receipt of the third instruction operation in the condition reception process.

2. The non-transitory recording medium according to claim 1, wherein:

the execution condition includes multiple items;

the availability information is provided to each of the multiple items;

the instructions, when executed by the controller, further cause the mobile terminal to:

determine, in the first determination process, whether the user condition falls within the range of the ability information for each of the multiple items;

determine, in the second determination process, whether the availability information corresponding to an item of which user condition is determined to be out of the range of the ability information is the first value or the second value; and cause the mobile terminal to execute the second execution instruction process in response to determining that the availability information is the first value for all items of which the user condition is determined to be out of the range of the ability information in the second determination process.

3. The non-transitory recording medium according to claim 2, wherein:

the mobile terminal comprises a display;

the instructions, when executed by the controller, further cause the mobile terminal to:

display a first screen on the display in response to determining, in the second determination process, that the availability information of at least one of the items of which user condition is out of the range of the ability information is the second value, the first screen including a recommended condition which is a modification of the user condition modified to fall within the range of the ability information;

execute a first reception process to receive an instruction operation to instruct a change to the recommended condition through the input interface; and cause the mobile terminal to transmit a third execution instruction to the designated device through the second communication interface in response to receipt of the instruction operation in the first reception process.

4. The non-transitory recording medium according to claim 2, wherein:

the mobile terminal comprises a display;

the instructions, when executed by the controller, further cause the mobile terminal to:

display an error screen notifying that the designated device will not execute the operation in response to determining, in the second determination process, that the availability information corresponding to at least one of the items of which the user condition is out of the range of the ability information on the display.

5. The non-transitory recording medium according to claim 1, wherein:

the instructions, when executed by the controller, further cause the mobile terminal to:

receive condition information indicating the device condition through one of the first communication interface and the second communication interface;

display a second screen on the display in response to determining that the availability information is the first value in the second determining process, the second screen including the device condition indicated by the condition information, a first object and a second object; and receive one of the first instruction operation to designate the first object and the second instruction operation to designate the second object through the input interface.

6. The non-transitory recording medium according to claim 1, wherein:

the mobile terminal further comprises a memory; and the instructions, when executed by the controller, further cause the mobile terminal to:

store a history record indicating the execution condition which is executed by the designated device in the memory;

execute a fourth determining process to determine whether the history record is stored in the memory in response to determining that the user condition is out or the range of the ability information;

execute a fourth execution instruction process to transmit fourth instruction information to the designated device through the second communication interface in response to determining that the history record is stored in the memory, the fourth instruction information being information instruction to execute the operation according to the execution condition indicated by the history record.

7. The non-transitory recording medium according to claim 6, wherein:

the history record includes designated device information identifying the designated device which is caused to execute the operation according to the execution condition;

the instructions, when executed by the controller, further cause the mobile terminal to determine, in the fourth determining process, whether the history record including the designated device information of the designated device as identified in the identifying process is stored in the memory.

8. The non-transitory recording medium according to claim 6, wherein the instructions, when executed by the controller, cause the mobile terminal to overwrite the history record previously stored with a new history record in the memory or to additionally store the new history record in the memory.

9. The non-transitory recording medium according to claim 1, wherein the instructions, when executed by the controller, further cause the mobile terminal to:

receive, through the input interface, a designating operation to designate one of multiple image processing apparatuses capable of executing a wireless communication through the second communication interface as the designated device;

execute the identifying process, the first receiving process, the second receiving process and the first determining process in response to the designated device not being designated; and execute the first execution instruction process without executing the identifying process, the second receiving process or the first determining process, in response to the designated device having been designated.

10. The non-transitory recording medium according to claim 1, wherein the second communication interface is capable of executing an indirect wireless communication to communicate with an external apparatus via a relaying device, and a direct wireless communication to communicate with the external apparatus not via the relaying device, wherein the instructions, when executed by the controller, further cause the mobile terminal to:

execute a connection information receiving process to receive connection information necessary to execute the direct wireless communication with the external apparatus from the designated device through the first communication interface; and communicate with the designated device in accordance with the direct wireless communication using the connection information, in one of the first receiving process, the second receiving process and the first execution instruction process.

11. A non-transitory recording medium of a mobile terminal having a controller, a first communication interface, a second communication interface and an input interface, the non-transitory recording medium storing computer-readable instructions, the first communication interface being configured to execute a near field communication, the second communication interface being configured to execute a wireless communication, the second communication interface having a communicatable range being wider than that of the first communication interface, the instructions, when executed by the controller, cause the mobile terminal to:

execute a condition reception process to receive a user condition through the input interface, the user condition being an execution condition of an operation with respect to image data executed by an image processing apparatus, execute an identifying process to identify the image processing apparatus communicatable through the first communication interface as a designated device;

execute a first receiving process to receive ability information of the designated device from the designated device through one of the first communication interface and the second communication interface;

execute a second receiving process to receive availability information indicating whether the designated device is configured to execute the operation according to a device condition from the designated device through one of the first communication interface and the second communication interface, the availability information having one of a first value and a second value, the first value indicating that the designated device is configured to execute the operation according to the device condition, the second value indicating that the designated device is not configured to execute the operation according to the device condition, the device condition being the execution condition determined by the designated device;

determine, in a first determination process, whether the user condition falls within a range of the ability information;

execute a first execution instruction process to transmit first execution instruction information to the designated device through the second communication interface in response to determination that the user condition falls within the range of the ability information, the first execution instruction information being information to instruct execution of the operation according to the user condition;

determine, in a second determination process, whether the availability information is the first value or the second value in response to determining that the user condition is out of the range of the ability information; and execute a second execution instruction process to transmit second execution instruction information to the designated device through the second communication interface in response to determining that the availability information is the first value, the second execution instruction information being information instructing execution of the operation according to the device condition, and wherein the instructions, when executed by the controller, further cause the mobile terminal to:

execute a second reception process to receive one of a first instruction operation corresponding to execution of the operation according to the device condition and a second instruction operation corresponding to non-execution of the operation according to the device condition through the input interface in response to determining in the second determination process that the availability information is the first value;

execute the second execution instruction process in response to receipt of the first instruction operation in the second reception process;

execute a third determining process to determine whether an initial condition set to the instructions coincides with the user condition;

execute the second reception process in response to determining that the availability information is the first value in the second determining process and determining that the initial condition does not coincide with the user condition in the third determining process; and execute the second execution instruction process without executing the second reception process in response to determining that the availability information is the first value in the second determining process and determining that the initial condition coincides with the user condition in the third determining process.

12. A non-transitory recording medium of a mobile terminal having a controller, a first communication interface, a second communication interface, a memory and an input interface, the non-transitory recording medium storing computer-readable instructions, the first communication interface being configured to execute a near field communication, the second communication interface being configured to execute a wireless communication, the second communication interface having a communicatable range being wider than that of the first communication interface, the instructions, when executed by the controller, cause the mobile terminal to:

execute a condition reception process to receive a user condition through the input interface, the user condition being an execution condition of an operation with respect to image data executed by an image processing apparatus, execute an identifying process to identify the image processing apparatus communicatable through the first communication interface as a designated device;

execute a first receiving process to receive ability information of the designated device from the designated device through one of the first communication interface and the second communication interface;

execute a second receiving process to receive availability information indicating whether the designated device is configured to execute the operation according to a device condition from the designated device through one of the first communication interface and the second communication interface, the availability information having one of a first value and a second value, the first value indicating that the designated device is configured to execute the operation according to the device condition, the second value indicating that the designated device is not configured to execute the operation according to the device condition, the device condition being the execution condition determined by the designated device;

determine, in a first determination process, whether the user condition falls within a range of the ability information;

execute a first execution instruction process to transmit first execution instruction information to the designated device through the second communication interface in response to determination that the user condition falls within the range of the ability information, the first execution instruction information being information to instruct execution of the operation according to the user condition;

determine, in a second determination process, whether the availability information is the first value or the second value in response to determining that the user condition is out of the range of the ability information; and execute a second execution instruction process to transmit second execution instruction information to the designated device through the second communication interface in response to determining that the availability information is the first value, the second execution instruction information being information instructing execution of the operation according to the device condition, and wherein the instructions, when executed by the controller, further cause the mobile terminal to:

execute a second reception process to receive one of a first instruction operation corresponding to execution of the operation according to the device condition and a second instruction operation corresponding to non-execution of the operation according to the device condition through the input interface in response to determining in the second determination process that the availability information is the first value;

execute the second execution instruction process in response to receipt of the first instruction operation in the second reception process;

receive condition information indicating the device condition through one of the first communication interface and the second communication interface;

display a second screen on the display in response to determining that the availability information is the first value in the second determining process, the second screen including the device condition indicated by the condition information, a first object and a second object;

receive one of the first instruction operation to designate the first object and the second instruction operation to designate the second object through the input interface;

store a history record received in the second receiving process and including the condition information in the memory; and when the condition information received in a most recent second receiving process and the condition information received previously and stored in the memory do not coincide with each other, display the second screen indicating items which are not coincident on the display.

13. A mobile terminal, comprising:

a first communication interface configured to execute a near field communication, a second communication interface configured to execute a wireless communication, the second communication interface having a communicatable range being wider than that of the first communication interface, an input interface, and a controller, the controller being configured to cause the mobile terminal to:

execute a condition reception process to receive a user condition through the input interface, the user condition being an execution condition of an operation with respect to image data executed by an image processing apparatus, execute an identifying process to identify the image processing apparatus communicatable through the first communication interface as a designated device;

execute a first receiving process to receive ability information of the designated device from the designated device through one of the first communication interface and the second communication interface;

execute a second receiving process to receive availability information indicating whether the designated device is configured to execute the operation according to a device condition from the designated device through one of the first communication interface and the second communication interface, the availability information having one of a first value and a second value, the first value indicating that the designated device is configured to execute the operation according to the device condition, the second value indicating that the designated device is not configured to execute the operation according to the device condition, the device condition being the execution condition determined by the designated device;

determine, in a first determination process, whether the user condition falls within a range of the ability information;

execute a first execution instruction process to transmit first execution instruction information to the designated device through the second communication interface in response to determination that the user condition falls within the range of the ability information, the first execution instruction information being information to instruct execution of the operation according to the user condition;

determine, in a second determination process, whether the availability information is the first value or the second value in response to determining that the user condition is out of the range of the ability information; and execute a second execution instruction process to transmit second execution instruction information to the designated device through the second communication interface in response to determining that the availability information is the first value, the second execution instruction information being information instructing execution of the operation according to the device condition, wherein the controller is further configured to:

execute a second reception process to receive one of a first instruction operation corresponding to execution of the operation according to the device condition and a second instruction operation corresponding to non-execution of the operation according to the device condition through the input interface in response to determining in the second determination process that the availability information is the first value;

execute the second execution instruction process in response to receipt of the first instruction operation in the second reception process;

enable receipt of a third instruction operation instructing to employ the device condition automatically when the received user condition is out of the ability information in the condition reception process;

receive the second execution instruction information in response to determining that the availability information is the first value and receipt of the third instruction operation; and execute the second execution instruction process without receiving the second execution instruction information in response to determining in the second determination process that the availability information is the first value and receipt of the third instruction operation in the condition reception process.

14. A method of controlling a mobile terminal having a communication interface configured to execute a wireless communication, and an input interface, the method including:

receiving, in a condition reception process, a user condition through the input interface;

identifying, in an identifying process, a designated device which is communicatable through the communication interface;

receiving, in a first receiving process, ability information from the designated device through the communication interface;

receiving, in a second receiving process, availability information through the communication interface;

determining, in a first determination process, whether the user condition falls within a range of the ability information;

transmitting, in a first execution instruction process, first execution instruction information to the designated device when the user condition falls within the range of the ability information, the first execution instruction information instructing execution of an operation according to the user condition, determining, in a second determination process, whether the availability information is a first value or a second value when the user condition is out of the range of the ability information; and transmitting, in a second execution instruction process, second execution instruction information to the designated device when the availability information is the first value, the second execution instruction information instructing execution of the operation according to a device condition from the designated device, wherein the method further comprises:

executing a second reception process to receive one of a first instruction operation corresponding to execution of the operation according to the device condition and a second instruction operation corresponding to non-execution of the operation according to the device condition through the input interface in response to determining in the second determination process that the availability information is the first value;

executing the second execution instruction process in response to receipt of the first instruction operation in the second reception process;

enabling receipt of a third instruction operation instructing to employ the device condition automatically when the received user condition is out of the ability information in the condition reception process;

receiving the second execution instruction information in response to determining that the availability information is the first value and receipt of the third instruction operation; and executing the second execution instruction process without receiving the second execution instruction information in response to determining in the second determination process that the availability information is the first value and receipt of the third instruction operation in the condition reception process.

* * * * *

UNITED STATES PATENT AND TRADEMARK OFFICE
CERTIFICATE OF CORRECTION

PATENT NO. : 10,477,041 B2
APPLICATION NO. : 15/409133
DATED : November 12, 2019
INVENTOR(S) : Norihiko Asai It is certified that error appears in the above-identified patent and that said Letters Patent is hereby corrected as shown below:

On the Title Page

Item (57), in the Abstract, Line 8:
Please delete "the rage" and insert --the range--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*